(12) United States Patent
Brown et al.

(10) Patent No.: US 10,752,846 B2
(45) Date of Patent: Aug. 25, 2020

(54) RESID UPGRADING WITH REDUCED COKE FORMATION

(71) Applicant: ExxonMobil Research and Engineering Company, Annandale, NJ (US)

(72) Inventors: Stephen H. Brown, Lebanon, NJ (US); Brian A. Cunningham, Tokyo (JP); Randolph J. Smiley, Hellertown, PA (US); Samia Ilias, Bridgewater, NJ (US); Brenda A. Raich, Annandale, NJ (US); Tien V. Le, Houston, TX (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 246 days.

(21) Appl. No.: 15/933,422

(22) Filed: Mar. 23, 2018

(65) Prior Publication Data
US 2018/0291288 A1 Oct. 11, 2018

Related U.S. Application Data

(60) Provisional application No. 62/482,739, filed on Apr. 7, 2017.

(51) Int. Cl.
| | |
|---|---|
| C10G 69/04 | (2006.01) |
| C10G 69/06 | (2006.01) |
| C10G 55/06 | (2006.01) |
| C10G 7/08 | (2006.01) |
| C10G 7/06 | (2006.01) |
| B01D 3/10 | (2006.01) |
| B01D 3/14 | (2006.01) |
| C10G 67/04 | (2006.01) |

(52) U.S. Cl.
CPC ............. *C10G 55/06* (2013.01); *B01D 3/10* (2013.01); *B01D 3/143* (2013.01); *C10G 7/06* (2013.01); *C10G 7/08* (2013.01); *C10G 67/049* (2013.01); *C10G 67/0454* (2013.01); *C10G 67/0463* (2013.01); *C10G 2300/1085* (2013.01); *C10G 2300/202* (2013.01); *C10G 2300/206* (2013.01); *C10G 2300/207* (2013.01); *C10G 2300/708* (2013.01)

(58) Field of Classification Search
CPC ..... C10G 67/0454; C10G 69/04; C10G 69/06
See application file for complete search history.

(56) References Cited

U.S. PATENT DOCUMENTS

| | | | | |
|---|---|---|---|---|
| 5,779,992 | A * | 7/1998 | Higashi | C10G 65/04 208/210 |
| 5,871,634 | A * | 2/1999 | Wiehe | C10G 9/005 208/48 R |
| 6,171,471 | B1 * | 1/2001 | Ferrughelli | C10G 67/0463 208/212 |
| 2011/0089080 | A1 * | 4/2011 | Kim | C10G 21/003 208/66 |
| 2013/0240407 | A1 | 9/2013 | Gillis | |
| 2016/0298048 | A1 | 10/2016 | Brown et al. | |

OTHER PUBLICATIONS

The International Search Report and Written Opinion of PCT/US2018/023924 dated Aug. 23, 2018.

\* cited by examiner

*Primary Examiner* — Randy Boyer
(74) *Attorney, Agent, or Firm* — Andrew T. Ward; Priya G. Prasad; Ryan L. Lobato

(57) ABSTRACT

Systems and methods are provided for improving the processing of heavy or challenged feeds in a refinery based on integrated use of deasphalting, coking, and hydroprocessing. An optional fluid catalytic cracking unit can be included in the integrated system to allow for further improvements. The improved processing can be facilitated based on a process configuration where the vacuum resid fractions and/or other difficult fractions are deasphalted to generate a deasphalted oil and a deasphalter residue or rock fraction. The deasphalted oil can be passed into a hydroprocessing unit for further processing. The rock fraction can be used as the feed to a coking unit. Although deasphalter residue or rock is typically a feed with a high content of micro carbon residue, a high lift deasphalting process can allow a portion of the micro carbon residue in the initial feed to remain with the deasphalted oil. The portion of micro carbon residue that remains in the deasphalted oil can then be upgraded during hydroprocessing and/or during subsequent processing of the feed. By reducing the amount of micro carbon residue passed into a coker for a given initial feed source, the overall capacity for a reaction system to handle heavy feeds can be increased relative to the rate of coke production from the reaction system.

20 Claims, 6 Drawing Sheets

RESID UPGRADING WITH REDUCED COKE FORMATION

CROSS-REFERENCE TO RELATED APPLICATIONS

This application claims the benefit of U.S. Provisional Application No. 62/482,739, filed on Apr. 7, 2017, the entire contents of which are incorporated herein by reference.

FIELD

Systems and methods are provided for deasphalting and hydroprocessing of various feeds, including catalytic slurry oil from FCC processing, vacuum resid, and coker bottoms, to form hydroprocessed product fractions.

BACKGROUND

Fluid catalytic cracking (FCC) processes are commonly used in refineries as a method for converting feedstocks, without requiring additional hydrogen, to produce lower boiling fractions suitable for use as fuels. While FCC processes can be effective for converting a majority of a typical input feed, under conventional operating conditions at least a portion of the resulting products can correspond to a fraction that exits the process as a "bottoms" fraction, which can be referred to as main column bottoms. This bottoms fraction can typically be a high boiling range fraction, such as a ~650° F.+(~343° C.+) fraction. Because this bottoms fraction may also contain FCC catalyst fines, this fraction can sometimes be referred to as a catalytic slurry oil.

Another process for conversion of feedstocks without requiring addition hydrogen is coking. Coking can convert various types of feeds to fuel boiling range fractions. Coking typically also results in production of lower value light ends and coke products. One constraint on the volume of feedstock that can be handled by a coker is the rate of formation of coke products.

U.S. Patent Application Publication 2013/0240407 describes methods for integrating solvent deasphalting with resin hydroprocessing and delayed coking. The methods include performing low yield solvent deasphalting (less than 55 wt % deasphalted oil yield) to form a deasphalted oil and one or more residue products. In aspects where a portion of the residue products corresponds to a deasphalter resin, the resin is hydrotreated. The remaining portion of the deasphalter residue (pitch or rock) is used as a feed for a coker.

SUMMARY

In various aspects, a method for processing a feedstock including at least one cracked feed component is provided. The method includes performing solvent deasphalting on a feedstock comprising a solubility blending number ($S_{BN}$) of 100 or more and/or a T90 distillation point of 566° C. or more and/or 8.0 wt % or more of micro carbon residue and/or 10 wt % or more of cracked feed to form a deasphalted oil and a deasphalter residue. A yield of the deasphalted oil can be about 50 wt % or more relative to a weight of the feedstock. The deasphalted oil can comprise a $S_{BN}$ of about 80 or more and/or about 2.0 wt % or more of micro carbon residue. At least a portion of the deasphalted oil can be exposed to a hydroprocessing catalyst under effective hydroprocessing conditions to form a hydroprocessed effluent.

In various aspects, the method can further comprise coking at least a portion of the deasphalter residue under effective coking conditions to form a coker effluent and coke. The deasphalter residue can optionally have a T10 distillation point of 566° C. or less. In some aspects, the coker effluent can include a coker bottoms. Optionally, the feedstock can include at least a portion of the coker bottoms. In some aspects, the coker effluent can include a coker gas oil. Optionally, a portion of the coker gas oil having a T10 distillation point of at least 343° C. can also be exposed (as part of the feedstock) to the hydroprocessing catalyst under the effective hydroprocessing conditions.

In some aspects, the hydroprocessing can be effective for increasing the API gravity of the resulting hydroprocessed effluent. For example, the hydroprocessing can be effective for producing a hydroprocessed effluent including a $C_{5+}$ portion that has an API gravity that is about 15 or more greater than an API gravity of the at least a portion of the deasphalted oil. Optionally, this can be accomplished by selecting hydroprocessing conditions that allow for addition of a substantial amount of hydrogen to the hydroprocessed effluent during hydroprocessing, such as at least 1500 SCF/bbl (~260 m³/m³). The hydroprocessed effluent can also include a reduced yield of a naphtha boiling range fraction, such as having a naphtha boiling range fraction that corresponds to about 10.0 wt % or less of the weight of the feed that is introduced into the hydroprocessing stage.

In some aspects, the feedstock and/or the at least a portion of the deasphalted oil can include about 1.0 wt % organic sulfur or more. The corresponding hydroprocessed effluent can include about 0.5 wt % or less of organic sulfur.

In some aspects, the feedstock can include 15 wt % or more of micro carbon residue. Additionally or alternately, 40 wt % or more of the carbons in the feedstock can correspond to aromatic carbons. Additionally or alternately, the deasphalted oil can include about 5.0 wt % or more of micro carbon residue. Additionally or alternately, 30 wt % or more of the carbons in the deasphalted oil can correspond to aromatic carbons.

In some aspects, the feedstock can include at least 20 wt % of the cracked feed. Additionally or alternatively, the cracked feed can include a catalytic slurry oil, a coker bottoms, a steam cracker tar, a visbreaker gas oil, a coal tar, or a combination thereof. Additionally or alternately, the cracked feed can include at least 50 wt % of a catalytic slurry oil relative to a weight of the cracked feed. Additionally or alternately, the cracked feed can include cracked feed having an T5 distillation point of at least 149° C. and a T90 distillation point of 566° C. or less.

In some aspects, the method can further include separating a first fraction having a T10 distillation point of at least 510° C. and a second fraction having a lower T10 distillation point from a feed having a T10 distillation point of at least 300° C. The feedstock can include at least a portion of the first fraction. The second fraction can be exposed to a catalyst under fluid catalytic cracking conditions to form a fluid catalytic cracking effluent comprising the catalytic slurry oil. Optionally in such aspects, the hydroprocessed effluent can include a hydroprocessed gas oil boiling range fraction, and at least a portion of the hydroprocessed gas oil boiling range fraction can also be exposed to the catalyst under the fluid catalytic cracking conditions.

In various aspects, a deasphalted oil is provided. The deasphalted oil can include a $S_{BN}$ of about 80 or more and/or 2.0 wt % or more of micro carbon residue and/or a T10 distillation point of 454° C. or less. Optionally, about 30 wt % or more of the carbons in the deasphalted oil can correspond to aromatic carbons, or about 40 wt % or more, or about 50 wt % or more. Optionally, the deasphalted oil can include about 5.0 wt % or more of micro carbon residue and/or a T50 distillation point of 566° C. or less and/or a API gravity of 0 or less.

In various aspects, a system for processing a feedstock is provided. The system can include a reduced pressure separation stage for forming a first fraction and a second fraction. The system can further include a fluid catalytic cracker comprising a fluid catalytic cracking (FCC) inlet and an FCC outlet. The FCC inlet can be in fluid communication with the reduced pressure separation stage for receiving the first fraction. The system can further include a deasphalting unit comprising a deasphalting inlet a, deasphalted oil outlet, and a deasphalter residue outlet. The deasphalting inlet can be in fluid communication with the reduced pressure separation stage for receiving the second fraction and/or in fluid communication with the FCC outlet for receiving a catalytic slurry oil fraction. The system can further include a coker comprising a coker inlet and a coker outlet. The coker inlet can be in fluid communication with the deasphalter residue outlet and/or the deasphalting inlet can be further in fluid communication with the coker outlet for receiving a coker bottoms fraction. The system can further include a hydroprocessing stage comprising a hydroprocessing inlet and a hydroprocessing outlet. The hydroprocessing inlet can be in fluid communication with the deasphalted oil outlet and/or in fluid communication with the coker outlet for receiving a coker gas oil fraction and/or the FCC inlet can be further in fluid communication with the hydroprocessing outlet for receiving a hydroprocessed gas oil boiling range fraction.

DETAILED DESCRIPTION

Figure 1:
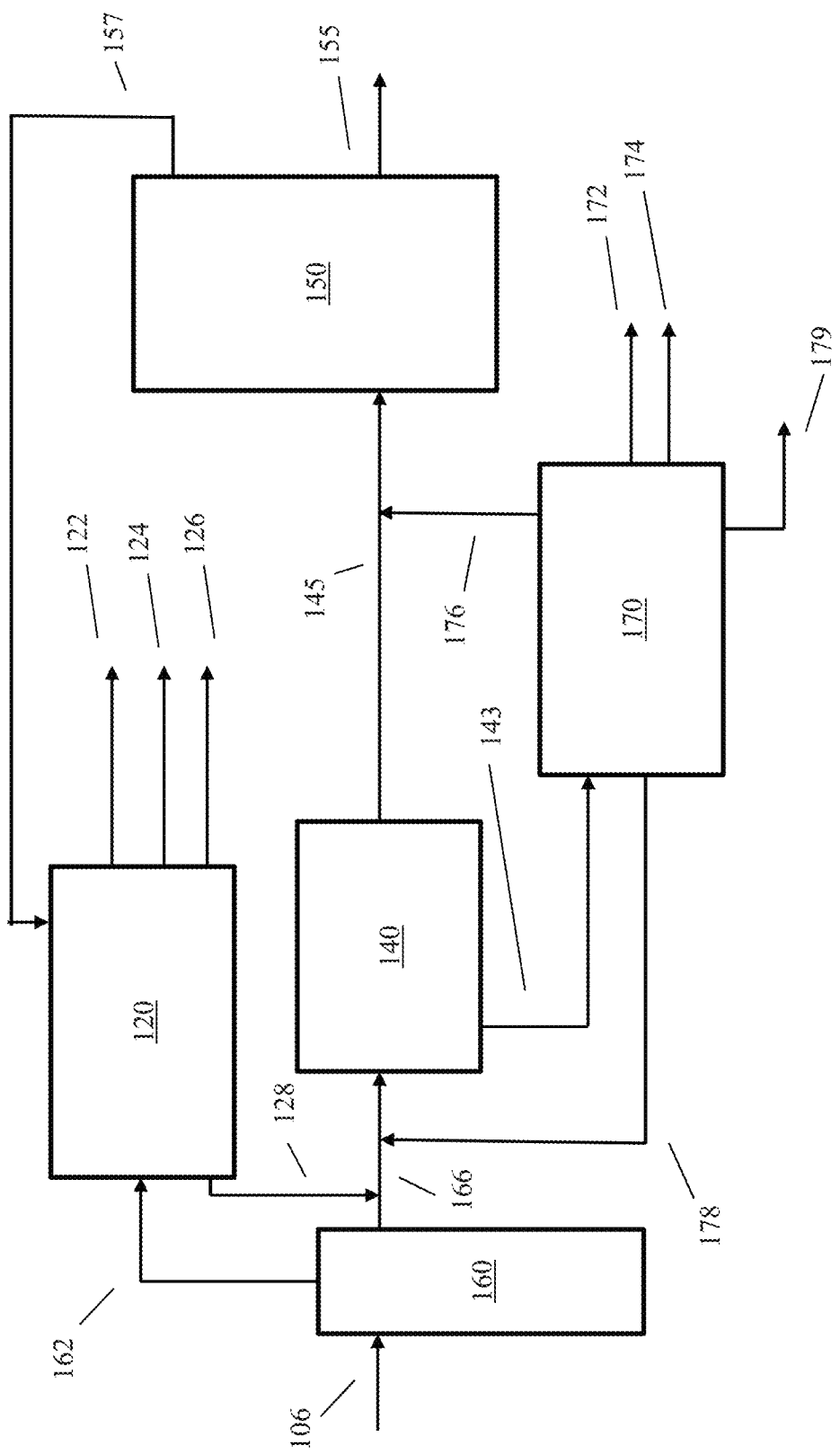
FIG. 1 shows an example of a reaction system for integrated processing that includes a fluid catalytic cracking unit, a coker, a deasphalting unit, and a hydroprocessing unit.

In various aspects, systems and methods are provided for improving the processing of heavy or challenged feeds in a refinery based on integrated use of deasphalting, coking, and hydroprocessing. Optionally, a fluid catalytic cracking unit can be included in the integrated system to allow for further improvements. The improved processing can be facilitated based on a process configuration where vacuum resid fractions and/or other difficult fractions are not introduced directly into a coker. Instead, the vacuum resid fractions and/or other difficult fractions are deasphalted to generate a deasphalted oil and a deasphalter residue or rock fraction. The deasphalted oil can be passed into a hydroprocessing unit for further processing. The rock fraction can be used as the feed to a coking unit. Although deasphalter residue or rock is typically a feed with a high content of micro carbon residue, a high lift deasphalting process can allow a portion of the micro carbon residue in the initial feed to remain with the deasphalted oil. The portion of micro carbon residue that remains in the deasphalted oil can then be upgraded during hydroprocessing and/or during subsequent processing of the feed. This avoids the typical outcome of micro carbon residue that is passed into a coker, where the yield of coke in a coker is typically greater than the content of micro carbon residue in the coker feed. By reducing the amount of micro carbon residue passed into a coker for a given initial feed source, the overall capacity for a reaction system to handle heavy feeds can be increased relative to the rate of coke production from the reaction system.

Additionally or alternately, in various aspects systems and methods are provided for upgrading various types of resid fractions and/or cracked refinery fractions by taking advantage of beneficial properties of the cracked refinery fractions. In particular, an intermediate feedstock can be formed in a refinery setting by combining catalytic slurry oil (i.e., bottoms from a fluid catalytic cracking process) with one or more other cracked feeds (such as coker bottoms) and/or with a vacuum resid feed. The intermediate feedstock can then be deasphalted to generate a deasphalted oil and a rock fraction. The deasphalted oil can be hydroprocessed at unexpectedly high conversion while the rock fraction can be used as a feed for a coker. After hydroprocessing, the hydroprocessed effluent can include a light ends fraction, a fuels fraction (naphtha and diesel), and a lubricant or gas oil boiling range fraction. The lubricant or gas oil boiling range fraction can be further processed to form lubricant base oils, or the fraction can be passed into a fluid catalytic cracking unit for production of olefins and fuels. Additionally or alternately, the heavier products can be suitable for use as an (ultra) low sulfur fuel oil, such as a fuel oil having a sulfur content of ~0.5 wt % or less (or ~0.1 wt % or less).

In some aspects, the systems and methods described herein can be beneficial in situations where feeds are available that have a high micro carbon residue content but that also can be used to produce deasphalted oils with high solubility blending numbers ($S_{BN}$). For example, the micro carbon residue of the feed portions delivered to deasphalting can be about 8 wt % or more, or about 12 wt % or more, or about 15 wt % or more, such as up to about 25 wt % or still higher. Deasphalting can then be performed on the feed at high lift (i.e., yield of deasphalted oil of at least 70 wt %, or at least 80 wt %, or at least 90 wt %, such as up to 95 wt % or more) to produce a deasphalted oil and deasphalter residue or rock. The deasphalted oil can include about 4.0 wt % micro carbon residue, or about 5.0 wt % or more, or about 6.0 wt % or more, or about 8.0 wt % or more, such as up to about 12 wt % or still higher. By including a substantial portion of micro carbon residue in the deasphalted oil, the amount of coke generated in an integrated coking process can be reduced. To reduce or minimize difficulties in subsequent hydroprocessing of the deasphalted oil, the deasphalted oil can also have an $S_{BN}$ of about 80 or more, or about 90 or more, or about 100 or more, such as up to about 150 or still higher. Deasphalted oils with high values of $S_{BN}$ can be generated, for example, by including a substantial portion of catalytic slurry oil in the feed portion to the deasphalter. By generating a deasphalted oil having this combination of properties, hydroprocessing can be used to upgrade the deasphalted oil while having reduced or minimized coke formation/precipitation during hydroprocessing, even though the feed to hydroprocessing contains compounds that would otherwise be converted to coke in a conventional refinery setting.

In addition to improving hydroprocessing of the deasphalted oil, inclusion of suitable cracked stocks can assist with processing of the deasphalter rock. Performing high lift deasphalting on a conventional vacuum resid fraction can result in formation of deasphalter rock that is difficult to process by coking. In order to improve the ability to process deasphalter rock from such a high lift process, the feed to deasphalting can include one or more cracked fractions that result in low boiling high-aromaticity rock fractions. For example, catalytic slurry oils, coker bottoms, steam cracker tars, coal tars, and visbreaker gas oils are examples of feeds for deasphalting that result in substantial quantities of gas oil boiling range components being incorporated into the rock fraction. By incorporating a sufficient amount of cracked components into the feed for deasphalting, the deasphalting can be performed under high yield conditions while still producing a deasphalter rock that is suitable for subsequent coking.

In addition to incorporating cracked feed components, in some aspects the feedstock to deasphalting can have a reduced or minimized content of virgin gas oil boiling range components. The lower boiling fractions from virgin crude oils can tend to have a relatively high content of paraffins and a correspondingly low content of aromatics. For example, a typical virgin gas oil fraction with a boiling range of 343° C. to 566° C. can have an aromatic carbon content (percent aromatic carbon) of 20% or less, or 15% or less, or possibly even 10% or less. The $S_{BN}$ for such typical virgin gas oil fractions can typically be 50 or less. Virgin Canadian and Venezuelan heavy oils (bitumens) are an important exception, as such bitumens typically have low paraffin contents and correspondingly higher $S_{BN}$ values. For example, gas oil fraction derived from bitumen with a paraffin content of 10 wt % or less can have a $S_{BN}$ of 70 or more, or 80 or more. Such bitumens can have a saturates content of about 30 wt % to about 50 wt %, or possibly higher. Aromatic carbon content can be determined by NMR, such as according to ASTM D5292 or a similar procedure.

Additionally or alternately, still another potential improvement can be related to using a deasphalted oil feed, in combination with appropriate hydroprocessing conditions, so that the amount of naphtha boiling range material in the hydroprocessed effluent is reduced or minimized. It has been unexpectedly discovered that generation of substantial quantities of naphtha boiling range products during hydrotreatment of the deasphalted oils described herein can lead to rapid catalyst deactivation and/or coke formation on catalyst and/or reactor plugging. Without being bound by any particular theory, it is believed that increased formation of naphtha boiling range products can lead to local decreases in the ability to maintain solvency of heavier, more aromatic portions of the feed and products. It is believed that maintaining a low amount of naphtha boiling range compounds in the hydroprocessed effluent can avoid precipitation of solids in the hydroprocessing reactor. In various aspects, this can correspond to limiting the naphtha boiling range products ($C_5$-221° C.) in the hydroprocessed effluent to 10.0 wt % or less of the feed to the hydroprocessing stage, or 8.0 wt % or less, or 6.0 wt % or less, or 4.0 wt % or less, such as down to 0.1 wt % or still lower. Additionally or alternately, maintaining a low amount of naphtha boiling range compounds in the hydroprocessed effluent can correspond to reducing or minimizing the amount of conversion of feed relative to 430° F. (221° C.) that results in formation of naphtha products. Typically, a deasphalted oil can have a minimal content of naphtha boiling range compounds. Thus, unless naphtha boiling range compounds are added to the feed prior to hydroprocessing, the content of naphtha boiling range compounds present in the hydroprocessed effluent can correspond to the compounds that are created by conversion of heavier portions of the feed. Therefore, one option for controlling the hydroprocessing conditions can be to select a desired conversion relative to 221° C. However, it is not necessarily desirable to minimize conversion relative to 221° C., as any conversion products corresponding to light ends (e.g., $C_4$ or smaller hydrocarbons, $H_2S$) do not correspond to naphtha boiling range products. Instead, the amount of conversion relative to 221° C. can be selected based on the difference (in wt %) between the amount of conversion relative to 221° C. and the amount of light ends (in wt %) generated by the conversion. For example, if hydroprocessing results in 10 wt % conversion relative to 221° C., but 6 wt % of the hydroprocessed effluent corresponds to $C_{4-}$ hydrocarbons, $H_2S$, and other light ends, then only 4 wt % of the converted products will correspond to naphtha boiling range conversion products. In various aspects, the difference (in wt %) between the amount of conversion relative to 221° C. and the amount of light ends (in wt %) generated by the conversion can be 10 wt % or less, or 8.0 wt % or less, or 6.0 wt % or less, or 4.0 wt % or less, such as down to 0.1 wt % or still lower. It is understood that the two "wt %" values represented in this difference value do not strictly have the same units, but the difference value is still believed to be useful in understanding how to control the process conditions.

Conventionally, a catalytic slurry oil fraction (i.e., a bottoms fraction from an FCC process) is a challenging feed for hydroprocessing. A simple option would be to try to recycle the FCC bottoms to a pre-hydrotreater for the FCC process (sometimes referred to as a catalytic feed hydrotreater) and/or the FCC process itself. Unfortunately, recycle of FCC bottoms to a pre-hydrotreatment process has conventionally been ineffective, in part due to the presence of asphaltenes in the FCC bottoms. Typical FCC bottoms fractions can have a relatively high insolubility number ($I_N$) of about 70 to about 130, which corresponds to the volume percentage of toluene that would be needed to maintain solubility of a given petroleum fraction. According to conventional practices, combining a feed with an $I_N$ of greater than about 50 with a virgin crude oil fraction can lead to rapid coking under hydroprocessing conditions.

More generally, it can be conventionally understood that conversion of ~1050° F.+(~566° C.+) vacuum resid fractions by hydroprocessing and/or hydrocracking can be limited by incompatibility. Under conventional understanding, at somewhere between ~30 wt % and ~55 wt % conversion of the ~1050° F.+(~566° C.+) portion, the reaction product during hydroprocessing can become incompatible with the feed. For example, as the ~566° C.+ feedstock converts to ~1050° F.– (~566° C.–) products, hydrogen transfer, oligomerization, and dealkylation reactions can occur which create molecules that are increasingly difficult to keep in solution. Somewhere between ~30 wt % and ~55 wt %~566° C.+ conversion, a second liquid hydrocarbon phase separates. This new incompatible phase, under conventional understanding, can correspond to mostly polynuclear aromatics rich in N, S, and metals. The new incompatible phase can potentially be high in micro carbon residue (MCR). The new incompatible phase can stick to surfaces in the unit where it cokes and then can foul the equipment. Based on this conventional understanding, catalytic slurry oil can conventionally be expected to exhibit properties similar to a vacuum resid fraction during hydroprocessing. A catalytic slurry oil can have an $I_N$ of about 70 to about 130, ~1-6 wt % n-heptane insolubles and a boiling range profile that includes about 3 wt % to about 12 wt % or less of ~566° C.+ material. Based on the above conventional understanding, it can be expected that hydroprocessing of a catalytic slurry oil would cause incompatibility as the asphaltenes and/or ~566° C.+ material converts.

In contrast to conventional understanding, it has been discovered that hydroprocessing can be performed while reducing or minimizing the above difficulties by using a feed composed of a substantial portion of a catalytic slurry oil, with a minor amount (or less) of a conventional vacuum resid feed. A catalytic slurry oil can be processed as part of a feed where the catalytic slurry oil corresponds to at least about 25 wt % of the feed to a process for forming fuels, such as at least about 50 wt %, at least about 75 wt %, at least about 90 wt %, or at least about 95 wt %. Optionally, the feed can correspond to at least about 99 wt % of a catalytic slurry oil, therefore corresponding to a feed that consists essentially of catalytic slurry oil. In particular, a feed can comprise about 25 wt % to about 100 wt % catalytic slurry oil, or about 25 wt % to about 99 wt %, or about 50 wt % to about 90 wt %. In contrast to many types of potential feeds for production of fuels, the asphaltenes in a catalytic slurry oil can apparently be converted on a time scale comparable to the time scale for conversion of other aromatic compounds in the catalytic slurry oil. In other words, without being bound by any particular theory, the asphaltene-type compounds in a catalytic slurry oil that are susceptible to precipitation/insolubility can be converted at a proportional rate to the conversion of compounds that help to maintain solubility of asphaltene-type compounds. This can have the effect that during hydroprocessing, the rate of decrease of the $S_{BN}$ for the catalytic slurry oil can be similar to the rate of decrease of $I_N$, so that precipitation of asphaltenes during processing can be reduced, minimized, or eliminated. As a result, it has been unexpectedly discovered that catalytic slurry oil can be processed at effective hydroprocessing conditions for substantial conversion of the feed without causing excessive coking of the catalyst. This can allow hydroprocessing to be used to at least partially break down the ring structures of the aromatic cores in the catalytic slurry oil. In a sense, hydroprocessing of a catalytic slurry oil as described herein can serve as a type of "hydrodeasphalting", where the asphaltene type compounds are removed by hydroprocessing rather than by solvent extraction. In various aspects, the 566° C.+ conversion during hydroprocessing for a feed including catalytic slurry oil can be at least 55 wt %, or at least 65 wt %, or at least 75 wt %, such as up to about 95 wt % or still higher.

In some aspects, still further benefits can be achieved by deasphalting a combined feed that includes catalytic slurry oil and other cracked components prior to hydroprocessing. Deasphalting can further increase the difference between the $S_{BN}$ and the $I_N$ for a deasphalted oil relative to the initial feed to deasphalting. Optionally, a vacuum resid fraction can be combined with catalytic slurry oil (and other optional cracked fractions) prior to deasphalting. Some potential benefits of performing solvent deasphalting on a catalytic slurry oil can be related to the resulting solubility characteristics of the deasphalted oil. The bottoms fraction from an FCC process can typically correspond to a fraction with both a high solubility number ($S_{BN}$) and a high insolubility number ($I_N$). For example, a typical catalytic slurry oil can have an $S_{BN}$ of about 100 to about 250 (or greater) and an $I_N$ of about 70 to about 130. One of skill in the art would expect that co-processing 10+ wt % of catalytic slurry oil with a vacuum gas oil feed under fixed bed conditions would result in substantial precipitation of asphaltenes and/or other types of reactor fouling and plugging. By contrast, a deasphalted oil formed from a catalytic slurry oil can be a beneficial component for co-processing with a vacuum gas oil. During solvent deasphalting with a $C_{5+}$ solvent, such as n-pentane, isopentane, or a mixture of $C_{5+}$ alkanes, a portion of the compounds contributing to the high $I_N$ value of the catalytic slurry oil can be separated into the rock fraction due to insolubility with the alkane solvent. This can result in a deasphalted oil that has an increased difference between $S_{BN}$ and $I_N$ relative to the corresponding difference for the catalytic slurry oil. For example, the difference between $S_{BN}$ and $I_N$ for the feed containing the catalytic slurry oil can be 60 or less, or 50 or less, or 40 or less, while the difference between $S_{BN}$ and $I_N$ for the corresponding deasphalted oil can be at least 60, or at least 70, or at least 80. As another example, when a deasphalted oil based on a catalytic slurry oil is used as a co-feed, the difference between $S_{BN}$ and $I_N$ for the deasphalted oil can be at least 10 greater, or at least 20 greater, or at least 30 greater than the difference between $S_{BN}$ and $I_N$ for the co-feed. This additional difference between the $S_{BN}$ and $I_N$ can reduce or minimize difficulties associated with co-processing of other heavy oil fractions with a catalytic slurry oil. Additionally, the high $S_{BN}$ values of the deasphalted oil can be beneficial for providing improved solubility properties when blending the deasphalted oil with other fractions. This can include providing improved solubility properties, for example, for a deasphalted oil formed by deasphalting a feed that includes both catalytic slurry oil and one or more other types of fractions (such as a vacuum resid fraction).

Other benefits of performing solvent deasphalting on a catalytic slurry oil can be related to the ability to remove catalyst fines. Catalytic slurry oils can typically contain catalyst fines from the prior FCC process. During solvent deasphalting, catalyst fines within a catalytic slurry oil can be concentrated in the residual or deasphalter rock fraction produced from the deasphalting process. The deasphalted oil can be substantially free of catalyst fines, even at deasphalter lifts of greater than 90 wt % (i.e., yields of deasphalted oil of greater than 90 wt %). Due to the nature of solvent deasphalting, the presence of catalyst fines in the feed to the solvent deasphalter and/or in the deasphalter rock formed during deasphalting can have a reduced or minimal impact on the deasphalting process. As a result, solvent deasphalting can allow for production of a deasphalted oil at high yield while minimizing the remaining content of catalyst fines in the deasphalted oil.

FIG. 1 shows an example of a configuration that can provide one or more of the above benefits. In FIG. 1, the flows between processes are configured in a manner that can allow for reduced flow rates into the coking process. For systems that are limited based on coker capacity, the configuration in FIG. 1 can provide an option for increasing the total feed processing capacity by reducing the amount of coker capacity required per barrel of feed.

In FIG. 1, a feed 106 having a 600° F.+(316° C.+) fraction, such as an atmospheric resid, is passed into a vacuum distillation tower 160 or another suitable separation stage (such as a reduced pressure separation stage) for forming a vacuum gas oil portion 162 and a vacuum resid portion 166. The vacuum gas oil portion 162 can have a T90 distillation point that is suitable for processing in a fluid catalytic cracking process, such as a T90 distillation point of 482° C. or less, or 510° C. or less, or 538° C. or less, or 566° C. or less. The T10 distillation point for the vacuum gas oil portion 362 can correspond to any convenient value based on the nature of the feed 106. In some aspects, the T10 distillation point can be about 316° C. or more, or about 343° C. or more, or about 370° C. or more. The vacuum resid portion 166 can correspond to a remaining or bottoms portion of feed 306 after separation of vacuum gas oil portion 162 from feed 106.

The vacuum gas oil portion 162 can be passed into a fluid catalytic cracker 120. Optionally, a hydrotreated vacuum gas oil fraction 157 from hydroprocessing unit 150 can also be recycled for inclusion as part of the feed to the fluid catalytic cracker 120. This results in generation of typical fluid catalytic cracking (FCC) products, such as light ends 122, naphtha boiling range fraction 124, and one or more cycle oils 126. Additionally, the FCC process generates a catalytic slurry oil 128 as a bottoms product. Optionally, catalytic slurry oil 128 can include additional catalytic slurry oil from other FCC processes that are not integrated with the system shown in FIG. 1 (including, but not limited to, FCC processes at remote locations). In some aspects, fluid catalytic cracker 120 can be optional, with catalytic slurry oil 128 being derived from non-integrated FCC processes. In such an optional aspect, vacuum gas oil portion 162 can undergo any convenient type of further processing, such as processing to form lubricant base oils.

Instead of passing a vacuum resid feed into coker 170, the feed to the coker 170 corresponds to a deasphalter residue or rock fraction 143. In addition to reducing the net flow rate to the coker 170, using rock fraction 143 as the feed to coker 170 can reduce the total amount of coke generated by allowing other processes to handle portions of the feed that would otherwise be converted to coke. This results in generation of typical coker products, such as light ends 172, a coker naphtha boiling range fraction 174, and coke 179. In the configuration shown in FIG. 1, coker gas oil 176 can be added to the deasphalted oil 145 for further treatment in hydroprocessing unit 150. Additionally, the coking process generates a coker bottoms 178. Under conventional operation, coker bottoms 178 would be recycled back to coker 170. By contrast, in the configuration shown in FIG. 1, at least a portion of coker bottoms 178 is combined with catalytic slurry oil 128 for further processing. Optionally, additional coker bottoms from other non-integrated cokers (such as a coker in a remote location) can be included as part of coker bottoms 178.

The catalytic slurry oil 128, coker bottoms 178, and vacuum resid fraction 166 are passed into deasphalter 140. This results in formation of a deasphalted oil 145 and a deasphalter residue or rock 143. Preferably, deasphalter 140 can use a deasphalting solvent suitable for producing a yield of deasphalted oil of about 60 wt % or more, or about 70 wt % or more, or about 80 wt % or more, such as up to about 95 wt % or possibly still higher. The deasphalted oil 145 can then be passed into a hydroprocessor 150 under effective hydroprocessing conditions, such as fixed bed (including trickle bed) hydrotreating conditions, to produce a hydroprocessed effluent 155. An example of a fraction that can be included in the hydrotreated effluent 155 is a hydrotreated vacuum gas oil fraction 157. The hydrotreated vacuum gas oil fraction 157 can be recycled back to fluid catalytic cracker 120, or the hydrotreated vacuum gas oil fraction 157 can undergo other further processing, such as further processing to form lubricant base oils.

It is noted that the components shown in FIG. 1 can include various inlets and outlets that permit fluid communication between the components shown in FIG. 1. For example, a fluid catalytic cracker can include a fluid catalytic cracking (FCC) inlet and an FCC outlet; a hydroprocessor can include a hydroprocessor inlet and hydroprocessor outlet; a coker can include a coker inlet and a coker outlet; and a deasphalting unit can include a deasphalted oil outlet and a deasphalter residue outlet. The flow paths in FIG. 1 can represent fluid communication between the components. Fluid communication can refer to direct fluid communication or indirect fluid communication. Indirect fluid communication refers to fluid communication where one or more intervening process elements are passed through for fluids (and/or solids) that are communicated between the indirectly communicating elements. For example, vacuum distillation tower 160 is in indirect fluid communication with hydroprocessor 150 via deasphalting unit 140.

As defined herein, the term "hydrocarbonaceous" includes compositions or fractions that contain hydrocarbons and hydrocarbon-like compounds that may contain heteroatoms typically found in petroleum or renewable oil fraction and/or that may be typically introduced during conventional processing of a petroleum fraction. Heteroatoms typically found in petroleum or renewable oil fractions include, but are not limited to, sulfur, nitrogen, phosphorous, and oxygen. Other types of atoms different from carbon and hydrogen that may be present in a hydrocarbonaceous fraction or composition can include alkali metals as well as trace transition metals (such as Ni, V, or Fe).

In some aspects, reference may be made to conversion of a feedstock relative to a conversion temperature. Conversion relative to a temperature can be defined based on the portion of the feedstock that boils at greater than the conversion temperature. The amount of conversion during a process (or optionally across multiple processes) can correspond to the weight percentage of the feedstock converted from boiling above the conversion temperature to boiling below the conversion temperature. As an illustrative hypothetical example, consider a feedstock that includes 40 wt % of components that boil at 700° F. (~371° C.) or greater. By definition, the remaining 60 wt % of the feedstock boils at less than 700° F. (~371° C.). For such a feedstock, the amount of conversion relative to a conversion temperature of ~371° C. would be based only on the 40 wt % that initially boils at ~371° C. or greater. If such a feedstock could be exposed to a process with 30% conversion relative to a ~371° C. conversion temperature, the resulting product would include 72 wt % of ~371° C.− components and 28 wt % of ~371° C.+ components.

In various aspects, reference may be made to one or more types of fractions generated during distillation of a feedstock or effluent. Such fractions may include naphtha fractions, kerosene fractions, diesel fractions, and other heavier (gas oil) fractions. Each of these types of fractions can be defined based on a boiling range, such as a boiling range that includes at least ~90 wt % of the fraction, or at least ~95 wt % of the fraction. For example, for many types of naphtha fractions, at least ~90 wt % of the fraction, or at least ~95 wt %, can have a boiling point in the range of ~85° F. (~29° C.) to ~350° F. (~177° C.). For some heavier naphtha fractions, at least ~90 wt % of the fraction, and preferably at least ~95 wt %, can have a boiling point in the range of ~85° F. (~29° C.) to ~400° F. (~204° C.). For a kerosene fraction, at least ~90 wt % of the fraction, or at least ~95 wt %, can have a boiling point in the range of ~300° F. (~149° C.) to ~600° F. (~288° C.). For a kerosene fraction targeted for some uses, such as jet fuel production, at least ~90 wt % of the fraction, or at least ~95 wt %, can have a boiling point in the range of ~300° F. (~149° C.) to ~550° F. (~288° C.). For a diesel fraction, at least ~90 wt % of the fraction, and preferably at least ~95 wt %, can have a boiling point in the range of ~350° F. (~177° C.) to ~700° F. (~371° C.). For a (vacuum) gas oil fraction, at least ~90 wt % of the fraction, and preferably at least ~95 wt %, can have a boiling point in the range of ~650° F. (~343° C.) to ~1100° F. (~593° C.). Optionally, for some gas oil fractions, a narrower boiling range may be desirable. For such gas oil fractions, at least ~90 wt % of the fraction, or at least ~95 wt %, can have a boiling point in the range of ~650° F. (~343° C.) to ~1000° F. (~538° C.), or ~650° F. (~343° C.) to ~900° F. (~482° C.). Optionally, a gas oil fraction can also be referred to as a lubricant boiling range fraction. A residual fuel product can have a boiling range that may vary and/or overlap with one or more of the above boiling ranges. A residual marine fuel product can satisfy the requirements specified in ISO 8217, Table 2. The calculated carbon aromaticity index (CCAI) can be determined according to ISO 8217. BMCI can refer to the Bureau of Mines Correlation Index, as commonly used by those of skill in the art.

In this discussion, the effluent from a processing stage may be characterized in part by characterizing a fraction of the products. For example, the effluent from a processing stage may be characterized in part based on a portion of the effluent that can be converted into a liquid product. This can correspond to a $C_3+$ portion of an effluent, and may also be referred to as a total liquid product. As another example, the effluent from a processing stage may be characterized in part based on another portion of the effluent, such as a $C_5+$ portion or a $C_6+$ portion. In this discussion, a portion corresponding to a "$C_x+$" portion can be, as understood by those of skill in the art, a portion with an initial boiling point that roughly corresponds to the boiling point for an aliphatic hydrocarbon containing "x" carbons.

In this discussion, a low sulfur fuel oil can correspond to a fuel oil containing about 0.5 wt % or less of sulfur. An ultra low sulfur fuel oil, which can also be referred to as an Emission Control Area fuel, can correspond to a fuel oil containing about 0.1 wt % or less of sulfur. A low sulfur diesel can correspond to a diesel fuel containing about 500 wppm or less of sulfur. An ultra low sulfur diesel can correspond to a diesel fuel containing about 15 wppm or less of sulfur, or about 10 wppm or less.

In this discussion, reference may be made to catalytic slurry oil, FCC bottoms, and main column bottoms. These terms can be used interchangeably herein. It is noted that when initially formed, a catalytic slurry oil can include several weight percent of catalyst fines. Any such catalyst fines can be removed prior to incorporating a fraction derived from a catalytic slurry oil into a product pool, such as a naphtha fuel pool or a diesel fuel pool. In this discussion, unless otherwise explicitly noted, references to a catalytic slurry oil are defined to include catalytic slurry oil either prior to or after such a process for reducing the content of catalyst fines within the catalytic slurry oil.

Solubility Number and Insolubility Number

A method of characterizing the solubility properties of a petroleum fraction can correspond to the toluene equivalence (TE) of a fraction, based on the toluene equivalence test as described for example in U.S. Pat. No. 5,871,634 (incorporated herein by reference with regard to the definition for toluene equivalence, solubility number ($S_{BN}$), and insolubility number ($I_N$)). Briefly, the determination of the Insolubility Number ($I_N$) and the Solubility Blending Number ($S_{BN}$) for a petroleum oil containing asphaltenes requires testing the solubility of the oil in test liquid mixtures at the minimum of two volume ratios of oil to test liquid mixture. The test liquid mixtures are prepared by mixing two liquids in various proportions. One liquid is nonpolar and a solvent for the asphaltenes in the oil while the other liquid is nonpolar and a nonsolvent for the asphaltenes in the oil. Since asphaltenes are defined as being insoluble in n-heptane and soluble in toluene, it is most convenient to select the same n-heptane as the nonsolvent for the test liquid and toluene as the solvent for the test liquid. Although the selection of many other test nonsolvents and test solvents can be made, their use provides not better definition of the preferred oil blending process than the use of n-heptane and toluene described here.

A convenient volume ratio of oil to test liquid mixture is selected for the first test, for instance, 1 ml, of oil to 5 ml. of test liquid mixture. Then various mixtures of the test liquid mixture are prepared by blending n-heptane and toluene in various known proportions. Each of these is mixed with the oil at the selected volume ratio of oil to test liquid mixture. Then it is determined for each of these if the asphaltenes are soluble or insoluble. Any convenient method might be used. One possibility is to observe a drop of the blend of test liquid mixture and oil between a glass slide and a glass cover slip using transmitted light with an optical microscope at a magnification of from 50 to 600×. If the asphaltenes are in solution, few, if any, dark particles will be observed. If the asphaltenes are insoluble, many dark, usually brownish, particles, usually 0.5 to 10 microns in size, will be observed. Another possible method is to put a drop of the blend of test liquid mixture and oil on a piece of filter paper and let dry. If the asphaltenes are insoluble, a dark ring or circle will be seen about the center of the yellow-brown spot made by the oil. If the asphaltenes are soluble, the color of the spot made by the oil will be relatively uniform in color. The results of blending oil with all of the test liquid mixtures are ordered according to increasing percent toluene in the test liquid mixture. The desired value will be between the minimum percent toluene that dissolves asphaltenes and the maximum percent toluene that precipitates asphaltenes. More test liquid mixtures are prepared with percent toluene in between these limits, blended with oil at the selected oil to test liquid mixture volume ratio, and determined if the asphaltenes are soluble or insoluble. The desired value will be between the minimum percent toluene that dissolves asphaltenes and the maximum percent toluene that precipitates asphaltenes. This process is continued until the desired value is determined within the desired accuracy. Finally, the desired value is taken to be the mean of the minimum percent toluene that dissolves asphaltenes and the maximum percent toluene that precipitates asphaltenes. This is the first datum point, $T_1$, at the selected oil to test liquid mixture volume ratio, $R_1$. This test is called the toluene equivalence test.

The second datum point can be determined by the same process as the first datum point, only by selecting a different oil to test liquid mixture volume ratio. Alternatively, a percent toluene below that determined for the first datum point can be selected and that test liquid mixture can be added to a known volume of oil until asphaltenes just begin to precipitate. At that point the volume ratio of oil to test liquid mixture, $R_2$, at the selected percent toluene in the test liquid mixture, $T_2$, becomes the second datum point. Since the accuracy of the final numbers increase as the further apart the second datum point is from the first datum point, the preferred test liquid mixture for determining the second datum point is 0% toluene or 100% n-heptane. This test is called the heptane dilution test.

The Insolubility Number, $I_N$, is given by:

$$I_N = T_2 - \left[\frac{T_2 - T_1}{R_2 - R_1}\right] R_2 \quad (1)$$

and the Solubility Blending Number, $S_{BN}$, is given by:

$$S_{BN} = I_N \left[1 + \frac{1}{R_2}\right] - \frac{T_2}{R_2} \quad (2)$$

It is noted that additional procedures are available, such as those specified in U.S. Pat. No. 5,871,634, for determination of $S_{BN}$ for oil samples that do not contain asphaltenes.

Feedstock to Deasphalting—Cracked Feed

In various aspects, at least a portion of the feed to deasphalting can correspond to a cracked feed fraction. A cracked feed is defined as a fraction generated by a cracking process, such as a thermal cracking process, a catalytic cracking process, a hydrocracking process (such as slurry hydrocracking), or a combination thereof. Optionally, a cracked feed can include an amount of aromatic carbons corresponding to about 30 wt % or more of the total carbons in the feed, or about 40 wt % or more, or about 50 wt % or more, or about 60 wt % or more, such as up to about 85 wt % for cracked feeds such as catalytic slurry oil, steam cracker tar, and coal tar. Coker gas oils can tend to have lower aromatic carbon contents, such as about 20 wt % to about 50 wt %. The cracked feed can correspond to at least 10 wt % of the feedstock to deasphalting, or at least 20 wt %, or at least 30 wt %. In particular, the feedstock to deasphalting can include 10 wt % to 90 wt % of cracked components, or 10 wt % to 50 wt %, or 30 wt % to 70 wt %. Optionally, at least 5 wt % of the feedstock can correspond to a catalytic slurry oil, or at least 10 wt %, or at least 20 wt %. In particular, the feed to deasphalting can include 5 wt % to 90 wt % of catalytic slurry oil, or 10 wt % to 30 wt %, or 10 wt % to 50 wt %, or 30 wt % to 50 wt %, or 30 wt % to 70 wt %. In some aspects, the amount (weight percent) of catalytic slurry oil in a feedstock to deasphalting can be equal to or greater than the combined amount of other cracked components in the feed to deasphalting.

A catalytic slurry oil is an example of a suitable cracked fraction. A catalytic slurry oil can correspond to a high boiling fraction, such as a bottoms fraction, from an FCC process. A variety of properties of a catalytic slurry oil can be characterized to specify the nature of a catalytic slurry oil feed. One aspect that can be characterized corresponds to a boiling range of the catalytic slurry oil. Typically the cut point for forming a catalytic slurry oil can be at least about 650° F. (~343° C.). As a result, a catalytic slurry oil can have a T5 distillation (boiling) point or a T10 distillation point of at least about 288° C., or at least about 316° C., or at least about 650° F. (~343° C.), as measured according to ASTM D2887. In some aspects the D2887 10% distillation point (T10) can be greater, such as at least about 675° F. (~357° C.), or at least about 700° F. (~371° C.). In some aspects, a broader boiling range portion of FCC products can be used as a feed (e.g., a 350° F.+/~177° C.+ boiling range fraction of FCC liquid product), where the broader boiling range portion includes a 650° F.+(~343° C.+) fraction that corresponds to a catalytic slurry oil. The catalytic slurry oil (650° F.+/~343° C.+) fraction of the feed does not necessarily have to represent a "bottoms" fraction from an FCC process, so long as the catalytic slurry oil portion comprises one or more of the other feed characteristics described herein.

In addition to and/or as an alternative to initial boiling points, T5 distillation point, and/or T10 distillation points, other distillation points may be useful in characterizing a feedstock. For example, a feedstock can be characterized based on the portion of the feedstock that boils above 1050° F. (~566° C.). In some aspects, a feedstock (or alternatively a 650° F.+/~343° C.+ portion of a feedstock) can have an ASTM D2887 T95 distillation point of 1050° F. (~566° C.) or greater, or a T90 distillation point of 1050° F. (~566° C.) or greater. If a feedstock or other sample contains components that are not suitable for characterization using D2887, ASTM D1160 may be used instead for such components.

In various aspects, density, or weight per volume, of the catalytic slurry oil can be characterized. The density of the catalytic slurry oil (or alternatively a 650° F.+/~343° C.+ portion of a feedstock) can be at least about 1.02 g/cm$^3$, or at least about 1.04 g/cm$^3$, or at least about 1.06 g/cm$^3$, or at least about 1.08 g/cm$^3$, such as up to about 1.20 g/cm$^3$. The density of the catalytic slurry oil can provide an indication of the amount of heavy aromatic cores that are present within the catalytic slurry oil.

Contaminants such as nitrogen and sulfur are typically found in catalytic slurry oils, often in organically-bound form. Nitrogen content can range from about 50 wppm to about 5000 wppm elemental nitrogen, or about 100 wppm to about 2000 wppm elemental nitrogen, or about 250 wppm to about 1000 wppm, based on total weight of the catalytic slurry oil. The nitrogen containing compounds can be present as basic or non-basic nitrogen species. Examples of nitrogen species can include quinolines, substituted quinolines, carbazoles, and substituted carbazoles.

The sulfur content of a catalytic slurry oil feed can be at least about 500 wppm elemental sulfur, based on total weight of the catalytic slurry oil. Generally, the sulfur content of a catalytic slurry oil can range from about 500 wppm to about 100,000 wppm elemental sulfur, or from about 1000 wppm to about 50,000 wppm, or from about 1000 wppm to about 30,000 wppm, based on total weight of the heavy component. Sulfur can usually be present as organically bound sulfur. Examples of such sulfur compounds include the class of heterocyclic sulfur compounds such as thiophenes, tetrahydrothiophenes, benzothiophenes and their higher homologs and analogs. Other organically bound sulfur compounds include aliphatic, naphthenic, and aromatic mercaptans, sulfides, di- and polysulfides.

Catalytic slurry oils can include n-heptane insolubles (NHI) or asphaltenes. In some aspects, the catalytic slurry oil feed (or alternatively a ~650° F.+/~343° C.+ portion of a feed) can contain at least about 1.0 wt % of n-heptane insolubles or asphaltenes, or at least about 2.0 wt %, or at least about 3.0 wt %, or at least about 5.0 wt %, such as up to about 10 wt % or more. In particular, the catalytic slurry oil feed (or alternatively a ~343° C.+ portion of a feed) can contain about 1.0 wt % to about 10 wt % of n-heptane insolubles or asphaltenes, or about 2.0 wt % to about 10 wt %, or about 3.0 wt % to about 10 wt %. Another option for characterizing the heavy components of a catalytic slurry oil can be based on the amount of micro carbon residue (MCR) in the feed. In various aspects, the amount of MCR in the catalytic slurry oil feed (or alternatively a ~343° C.+ portion of a feed) can be at least about 5 wt %, or at least about 8 wt %, or at least about 10 wt %, or at least about 12 wt %, such as up to about 20 wt % or more.

Based on the content of NHI and/or MCR in a catalytic slurry oil feed, the insolubility number ($I_N$) for such a feed can be at least about 60, such as at least about 70, at least about 80, or at least about 90. Additionally or alternately, the $I_N$ for such a feed can be about 140 or less, such as about 130 or less, about 120 or less, about 110 or less, about 100 or less, about 90 or less, or about 80 or less. Each lower bound noted above for $I_N$ can be explicitly contemplated in conjunction with each upper bound noted above for $I_N$. In particular, the $I_N$ for a catalytic slurry oil feed can be about 60 to about 140, or about 60 to about 120, or about 80 to about 140. The corresponding $S_{BN}$ for a catalytic slurry oil can be from about 100 to about 250.

Coker bottoms are another example of a cracked feed or fraction that can be incorporated as part of the feedstock to deasphalting. Coking is a thermal cracking process that is suitable for conversion of heavy feeds into fuels boiling range products. The feedstock to a coker typically also includes 5 wt % to 25 wt % recycled product from the coker, which can correspond to a bottoms portion of the liquid product generated by a coking process and can be referred to as coker bottoms. This recycle fraction allows metals, asphaltenes, micro-carbon residue, and/or other solids to be returned to the coker, as opposed to being incorporated into a coker gas oil product. This can maintain a desired product quality for the coker gas oil product, but results in a net increase in the amount of light ends and coke that are generated by a coking process. The coker bottoms can correspond to a fraction with a T10 distillation point of at least 550° F. (288° C.), or at least 300° C., or at least 316° C., and a T90 distillation point of 566° C. or less, or 550° C. or less, or 538° C. or less. The coker bottoms fraction can have an aromatic carbon content of about 20 wt % to about 50 wt %, or about 30 wt % to about 45 wt %, and a micro carbon residue content of about 2.0 wt % to about 15 wt %, or about 3.0 wt % to about 15 wt %, or about 2.0 wt % to about 10 wt %, or about 3.0 wt % to about 12 wt %. Coker bottoms can have a $S_{BN}$ of about 80 to about 160.

Conventionally, coker bottoms are recycled to the coker to avoid difficulties associated with traditional hydroprocessing of a coker bottoms fraction. Due to the metals, asphaltenes, micro-carbon residue, and/or other solids typically present in coker bottoms, performing hydroprocessing (such as fixed bed hydroprocessing) on a coker bottoms fraction can lead to rapid catalyst deactivation and/or rapid fouling of the hydroprocessing reactor. Surprisingly, it has been discovered that the difficulties in hydroprocessing of coker bottoms can be reduced or minimized by combining the coker bottoms with a catalytic slurry oil feed prior to hydroprocessing. Without being bound by any particular theory, it is believed that the high $S_{BN}$ values of typical catalytic slurry oils can allow a catalytic slurry oil to maintain solvency of asphaltenes and/or micro-carbon residue present in a heavy coker gas oil, such as a coker bottoms fraction, during hydroprocessing.

In some aspects, the weight percent of catalytic slurry oil in the feedstock to deasphalting can be greater than or equal to the amount of coker bottoms. In aspects where coker bottoms corresponds to a substantial portion of the cracked components in a feedstock to deasphalting, the amount of coker bottoms in the feedstock to deasphalting can generally be from about 5 wt % to about 50 wt %, or about 10 wt % to about 50 wt %, or about 20 wt % to about 35 wt %.

Other types of cracked stocks can also be suitable for improving the $S_{BN}$ of the resulting deasphalted oil and/or improving the properties of the deasphalter rock. Other types of cracked stocks include, but are not limited to, steam cracker tars, coal tars, and visbreaker gas oils.

For example, steam cracker tar (SCT) as used herein is also referred to in the art as "pyrolysis fuel oil". The terms can be used interchangeably herein. The tar will typically be obtained from the first fractionator downstream from a steam cracker (pyrolysis furnace) as the bottoms product of the fractionator, nominally having a boiling point of at least about 550° F.+(~288° C.+). Boiling points and/or fractional weight distillation points can be determined by, for example, ASTM D2892. Alternatively, SCT can have a T5 boiling point (temperature at which 5 wt % will boil off) of at least about 550° F. (~288° C.). The final boiling point of SCT can be dependent on the nature of the initial pyrolysis feed and/or the pyrolysis conditions, and typically can be about 1450° F. (~788° C.) or less.

SCT can have a relatively low hydrogen content compared to heavy oil fractions that are typically processed in a refinery setting. In some aspects, SCT can have a hydrogen content of about 8.0 wt % or less, about 7.5 wt % or less, or about 7.0 wt % or less, or about 6.5 wt % or less. In particular, SCT can have a hydrogen content of about 5.5 wt % to about 8.0 wt %, or about 6.0 wt % to about 7.5 wt %. Additionally or alternately, SCT can have a micro carbon residue (or alternatively Conradson Carbon Residue) of at least about 10 wt %, or at least about 15 wt %, or at least about 20 wt %, such as up to about 40 wt % or more.

SCT can also be highly aromatic in nature. The paraffin content of SCT can be about 2.0 wt % or less, or about 1.0 wt % or less, such as having substantially no paraffin content. The naphthene content of SCT can also be about 2.0 wt % or less or about 1.0 wt % or less, such as having substantially no naphthene content. In some aspects, the combined paraffin and naphthene content of SCT can be about 1.0 wt % or less. With regard to aromatics, at least about 30 wt % of SCT can correspond to 3-ring aromatics, or at least 40 wt %. In particular, the 3-ring aromatics content can be about 30 wt % to about 60 wt %, or about 40 wt % to about 55 wt %, or about 40 wt % to about 50 wt %. Additionally or alternately, at least about 30 wt % of SCT can correspond to 4-ring aromatics, or at least 40 wt %. In particular, the 4-ring aromatics content can be about 30 wt % to about 60 wt %, or about 40 wt % to about 55 wt %, or about 40 wt % to about 50 wt %. Additionally or alternately, the 1-ring aromatic content can be about 15 wt % or less, or about 10 wt % or less, or about 5 wt % or less, such as down to about 0.1 wt %.

Due to the low hydrogen content and/or highly aromatic nature of SCT, the solubility number ($S_{BN}$) and insolubility number ($I_N$) of SCT can be relatively high. SCT can have a $S_{BN}$ of at least about 100, and in particular about 120 to about 230, or about 150 to about 230, or about 180 to about 220. Additionally or alternately, SCT can have an $I_N$ of about 70 to about 150, or about 100 to about 150, or about 80 to about 140. Further additionally or alternately, the difference between $S_{BN}$ and $I_N$ for the SCT can be at least about 30, or at least about 40, or at least about 50, such as up to about 100.

SCT can also have a higher density than many types of crude or refinery fractions. In various aspects, SCT can have a density at 15° C. of about 1.08 g/cm$^3$ to about 1.20 g/cm$^3$, or 1.10 g/cm$^3$ to 1.18 g/cm$^3$. By contrast, many types of vacuum resid fractions can have a density of about 1.05 g/cm$^3$ or less. Additionally or alternately, density (or weight per volume) of the heavy hydrocarbon can be determined according to ASTM D287-92 (2006) Standard Test Method for API Gravity of Crude Petroleum and Petroleum Products (Hydrometer Method), which characterizes density in terms of API gravity. In general, the higher the API gravity, the less dense the oil. API gravity can be 5° or less, or 0° or less, such as down to about −10° or lower.

Contaminants such as nitrogen and sulfur are typically found in SCT, often in organically-bound form. Nitrogen content can range from about 50 wppm to about 10,000 wppm elemental nitrogen or more, based on total weight of the SCT. Sulfur content can range from about 0.1 wt % to about 10 wt %, based on total weight of the SCT.

Feedstock to Deasphalting—Additional Feedstocks

In some aspects, at least a portion of a feedstock to deasphalting can correspond to a vacuum resid fraction or another type 950° F.+(510° C.+), or 1000° F.+(538° C.+) fraction, or 1050° F.+(566° C.+) fraction. Such fractions are typically formed using vacuum distillation or another method involving reduced pressure separation. Another example of a reduced pressure separation method for forming a 950° F.+(510° C.+)/1000° F.+(538° C.+)/1050° F.+ (566° C.+) fraction is to perform a high temperature flash separation. The 950° F.+(510° C.+)/1000° F.+(538° C.+)/1050° F.+(566° C.+) fraction formed from the high temperature flash can be processed in a manner similar to a vacuum resid.

A vacuum resid fraction or a 950° F.+(510° C.+)/1000° F.+(538° C.+)/1050° F.+(566° C.+) fraction formed by another process (such as a flash fractionation bottoms or a bitumen fraction) can be deasphalted at low severity to form a deasphalted oil. Optionally, the feedstock can also include a portion of a conventional feed for lubricant base stock production, such as a vacuum gas oil.

A vacuum resid (or other 510° C.+) fraction can correspond to a fraction with a T5 distillation point (ASTM D2892, or ASTM D7169 if the fraction will not completely elute from a chromatographic system) of at least 950° F. (510° C.), or at least 1000° F. (538° C.), or at least 1050° F. (566° C.). Alternatively, a vacuum resid fraction can be characterized based on a T10 distillation point (ASTM D2892/D7169) of at least 950° F. (510° C.), or at least 1000° F. (538° C.), or at least 1050° F. (566° C.).

Resid (or other 510° C.+) fractions can be high in metals. For example, a resid fraction can be high in total nickel, vanadium and iron contents. In an aspect, a resid fraction can contain at least 0.00005 grams of Ni/V/Fe (50 wppm) or at least 0.0002 grams of Ni/V/Fe (200 wppm) per gram of resid, on a total elemental basis of nickel, vanadium and iron. In other aspects, the heavy oil can contain at least 500 wppm of nickel, vanadium, and iron, such as up to 1000 wppm or more. In still other aspects, a vacuum resid can correspond to a vacuum resid from a light crude. Such a vacuum resid from a light crude can have a metals content (Ni/V/Fe) of about 1 wppm to about 200 wppm.

Contaminants such as nitrogen and sulfur are typically found in resid (or other 510° C.+) fractions, often in organically-bound form. Nitrogen content can range from about 50 wppm to about 10,000 wppm elemental nitrogen or more, based on total weight of the resid fraction. Sulfur content can range from 500 wppm to 100,000 wppm elemental sulfur or more, based on total weight of the resid fraction, or from 1000 wppm to 50,000 wppm, or from 1000 wppm to 30,000 wppm.

Still another method for characterizing a resid (or other 510° C.+) fraction is based on the Conradson carbon residue (CCR) of the feedstock. The Conradson carbon residue of a resid fraction can be at least about 10 wt % or at least about 20 wt %. Additionally or alternatively, the Conradson carbon residue of a resid fraction can be about 50 wt % or less, such as about 40 wt % or less or about 30 wt % or less.

The amount of vacuum resid included in a feed to deasphalting can vary depending on the $S_{BN}$ of the vacuum resid, the desired lift or yield of deasphalted oil, and the $S_{BN}$ values of the other (cracked) components in the feedstock to deasphalting. Depending on the aspect, up to about 90 wt % of the feedstock to deasphalting can correspond to vacuum resid, or up to about 75 wt % of the feed, or up to about 50 wt % of the feed. Additionally or alternately, the amount of vacuum resid in the feed to deasphalting can correspond to about 5 wt % or more of the feed, or about 15 wt % or more, or about 30 wt % or more, or about 50 wt % or more. In particular, the amount of vacuum resid can be 5 wt % to 90 wt % of the feed, or 5 wt % to 50 wt %, or 15 wt % to 75 wt %, or 30 wt % to 90 wt %, or 50 wt % to 90 wt %. The combined feedstock to deasphalting can have an $S_{BN}$ of about 100 or more, or about 110 or more, or about 120 or more, such as up to about 160 or still higher. The combined feedstock to deasphalting can have a micro carbon residue content of about 10 wt % or more, or about 15 wt % or more, or about 20 wt % or more, such as up to about 35 wt % or still higher.

In some aspects, a minor portion of a virgin vacuum gas oil fraction can be included as part of the feedstock to deasphalting. The amount of virgin vacuum gas oil can correspond to 10 wt % or less of the feed to deasphalting, or 8.0 wt % or less, or 6.0 wt % or less. Typical (vacuum) gas oil fractions can include, for example, fractions with a T5 distillation point to T95 distillation point of 650° F. (343° C.)-1050° F. (566° C.), or 650° F. (343° C.)-1000° F. (538° C.), or 650° F. (343° C.)-950° F. (510° C.), or 650° F. (343° C.)-900° F. (482° C.), or ~700° F. (370° C.)-1050° F. (566° C.), or ~700° F. (370° C.)-1000° F. (538° C.), or ~700° F. (370° C.)-950° F. (510° C.), or 700° F. (370° C.)-900° F. (482° C.), or 750° F. (399° C.)-1050° F. (566° C.), or 750° F. (399° C.)-1000° F. (538° C.), or 750° F. (399° C.)-950° F. (510° C.), or 750° F. (399° C.)-900° F. (482° C.). For example a suitable vacuum gas oil fraction can have a T5 distillation point of at least 343° C. and a T95 distillation point of 566° C. or less; or a T10 distillation point of at least 343° C. and a T90 distillation point of 566° C. or less; or a T5 distillation point of at least 370° C. and a T95 distillation point of 566° C. or less; or a T5 distillation point of at least 343° C. and a T95 distillation point of 538° C. or less. Reducing or minimizing the amount of virgin vacuum gas oil added to the feedstock for deasphalting can allow the portion of virgin gas oil in the boiling range of 300° C. to 510° C. in the feedstock to be maintained at a low level.

Feedstock for Integrated Processing

In some aspects, the feedstock to deasphalting can be formed as part of integrated processing of a whole or partial crude oil feed. As an example, an atmospheric resid can be formed from a whole virgin crude by performing flash fractionation and/or atmospheric distillation of the crude. This can result in forming an atmospheric resid fraction with a T10 distillation point of at least 260° C., or at least 288° C., or at least 316° C., or at least 343° C. The remaining portion of the initial crude can be processed/used in any convenient manner.

The atmospheric resid can then be separated to form a vacuum gas oil fraction and a vacuum resid fraction. The separation to form a vacuum gas oil and a vacuum resid can be performed in any convenient manner. Such a separation can typically correspond to a separation performed at reduced pressure, so as to allow separation while reducing or minimizing thermal cracking of the separation products. The resulting vacuum gas oil can have a T90 distillation point of 510° C. or less, or 538° C. or less, or 566° C. or less. The resulting vacuum resid can have a T10 distillation point of at least 510° C., or at least 538° C., or at least 566° C. The vacuum gas oil fraction can be processed, for example, in a fluid catalytic cracker. This can produce a variety of product fractions, including a catalytic slurry oil. The catalytic slurry oil can be combined with (at least a portion of) the vacuum resid fraction to form a feedstock for deasphalting to produce a high yield (70 wt % or more) of deasphalted oil. The rock from deasphalting can be passed into a coker. This can generate a variety of coker product fractions, including a coker bottoms fraction that can also be incorporated into the feedstock to deasphalting as a cracked fraction. Additionally, the coking can generate a coker gas oil, a portion of which can potentially be included with the deasphalted oil prior to hydroprocessing. The resulting deasphalted oil (and any optional coker gas oil) can then be hydroprocessed to form a hydroprocessing effluent. In some aspects, a gas oil boiling range portion of the hydroprocessed effluent (such as a 371° C.+ fraction) can be used as an additional part of the feed to the fluid catalytic cracking process. Optionally, still other cracked fractions from other refinery processes and/or from other remote locations can also be added to the feed to deasphalting and/or added to the deasphalted oil prior to hydroprocessing.

Solvent Deasphalting

Solvent deasphalting is a solvent extraction process. In some aspects, suitable solvents for high yield deasphalting methods as described herein include alkanes or other hydrocarbons (such as alkenes) containing 4 to 7 carbons per molecule, or 5 to 7 carbons per molecule. Examples of suitable solvents include n-butane, isobutane, n-pentane, $C_{4+}$ alkanes, $C_{5+}$ alkanes, $C_{4+}$ hydrocarbons, and $C_{5+}$ hydrocarbons. In some aspects, suitable solvents for low yield deasphalting can include $C_3$ hydrocarbons, such as propane, or alternatively $C_3$ and/or $C_4$ hydrocarbons. Examples of suitable solvents for low yield deasphalting include propane, n-butane, isobutane, n-pentane, $C_{3+}$ alkanes, $C_{4+}$ alkanes, $C_{3+}$ hydrocarbons, and $C_{4+}$ hydrocarbons.

In this discussion, a solvent comprising $C_n$ (hydrocarbons) is defined as a solvent composed of at least 80 wt % of alkanes (hydrocarbons) having n carbon atoms, or at least 85 wt %, or at least 90 wt %, or at least 95 wt %, or at least 98 wt %. Similarly, a solvent comprising $C_{n+}$ (hydrocarbons) is defined as a solvent composed of at least 80 wt % of alkanes (hydrocarbons) having n or more carbon atoms, or at least 85 wt %, or at least 90 wt %, or at least 95 wt %, or at least 98 wt %.

In this discussion, a solvent comprising $C_n$ alkanes (hydrocarbons) is defined to include the situation where the solvent corresponds to a single alkane (hydrocarbon) containing n carbon atoms (for example, n=3, 4, 5, 6, 7) as well as the situations where the solvent is composed of a mixture of alkanes (hydrocarbons) containing n carbon atoms. Similarly, a solvent comprising $C_{n+}$ alkanes (hydrocarbons) is defined to include the situation where the solvent corresponds to a single alkane (hydrocarbon) containing n or more carbon atoms (for example, n=3, 4, 5, 6, 7) as well as the situations where the solvent corresponds to a mixture of alkanes (hydrocarbons) containing n or more carbon atoms. Thus, a solvent comprising $C_{4+}$ alkanes can correspond to a solvent including n-butane; a solvent include n-butane and isobutane; a solvent corresponding to a mixture of one or more butane isomers and one or more pentane isomers; or any other convenient combination of alkanes containing 4 or more carbon atoms. Similarly, a solvent comprising $C_{5+}$ alkanes (hydrocarbons) is defined to include a solvent corresponding to a single alkane (hydrocarbon) or a solvent corresponding to a mixture of alkanes (hydrocarbons) that contain 5 or more carbon atoms. Alternatively, other types of solvents may also be suitable, such as supercritical fluids. In various aspects, the solvent for solvent deasphalting can consist essentially of hydrocarbons, so that at least 98 wt % or at least 99 wt % of the solvent corresponds to compounds containing only carbon and hydrogen. In aspects where the deasphalting solvent corresponds to a $C_{4+}$ deasphalting solvent, the $C_{4+}$ deasphalting solvent can include less than 15 wt % propane and/or other $C_3$ hydrocarbons, or less than 10 wt %, or less than 5 wt %, or the $C_{4+}$ deasphalting solvent can be substantially free of propane and/or other $C_3$ hydrocarbons (less than 1 wt %). In aspects where the deasphalting solvent corresponds to a $C_{5+}$ deasphalting solvent, the $C_{5+}$ deasphalting solvent can include less than 15 wt % propane, butane and/or other $C_3$-$C_4$ hydrocarbons, or less than 10 wt %, or less than 5 wt %, or the $C_{5+}$ deasphalting solvent can be substantially free of propane, butane, and/or other $C_3$-$C_4$ hydrocarbons (less than 1 wt %).

Deasphalting of heavy hydrocarbons, such as vacuum resids, is known in the art and practiced commercially. A deasphalting process typically corresponds to contacting a heavy hydrocarbon with an alkane solvent (propane, butane, pentane, hexane, heptane etc and their isomers), either in pure form or as mixtures, to produce two types of product streams. One type of product stream can be a deasphalted oil extracted by the alkane, which is further separated to produce deasphalted oil stream. A second type of product stream can be a residual portion of the feed not soluble in the solvent, often referred to as rock or asphaltene fraction. The deasphalted oil fraction can be further processed into make fuels or lubricants. The rock fraction can be further used as blend component to produce asphalt, fuel oil, and/or other products. The rock fraction can also be used as feed to gasification processes such as partial oxidation, fluid bed combustion or coking processes. The rock can be delivered to these processes as a liquid (with or without additional components) or solid (either as pellets or lumps).

In addition to performing a separation on liquid portions of a feed, solvent deasphalting of a feed that includes a catalytic slurry oil can also be beneficial for separation of catalyst fines. FCC processing of a feed can tend to result in production of catalyst fines based on the catalyst used for the FCC process. These catalyst fines typically are segregated into the catalytic slurry oil fraction generated from an FCC process. During solvent deasphalting, any catalyst fines present in the feed to solvent deasphalting can tend to be incorporated into the deasphalter residue phase. As a result, the catalyst fines content (any catalyst particles of detectable size) of a deasphalted oil generated by solvent deasphalting can be less than about 10 wppm., or less than about 1.0 wppm. By contrast, the feed to solvent deasphalting can contain at least 10 wppm of catalyst fines, or at least 100 wppm, or possibly more.

Solvent deasphalting can also be beneficial for generating a deasphalted oil having a reduced insolubility number ($I_N$) relative to the $I_N$ of the feed to the deasphalting process. Producing a deasphalted oil having a reduced $I_N$ can be beneficial, for example, for allowing improved operation of downstream processes. For example, a suitable type of processing for a heavy hydrocarbon feed can be hydroprocessing under trickle bed conditions. Hydroprocessing of a feed can provide a variety of benefits, including reduction of undesirable heteroatoms and modification of various flow properties of a feed. Conventionally, however, feeds having an $I_N$ of greater than about 50 have been viewed as unsuitable for fixed bed (such as trickle bed) hydroprocessing. Catalytic slurry oils (prior to solvent deasphalting) are an example of a feed that can typically have an $I_N$ of greater than about 50. This conventional view can be due to the belief that feeds with an $I_N$ of greater than about 50 are likely to cause substantial formation of coke within a reactor, leading to rapid plugging of a fixed reactor bed. However, it has been unexpectedly discovered that deasphalting of a feed including (or substantially composed of) a catalytic slurry oil, even at high lift values of about 70 wt % deasphalted oil yield or greater, or about 80 wt % or greater, or about 90 wt % or greater, or 94 wt % or greater (such as up to 99 wt % or more), can generate a deasphalted oil that is suitable for processing under a variety of fixed bed conditions with only a moderate or typical level of coke formation. This can be due in part to the reduced $I_N$ value of the deasphalted oil generated by deasphalting, relative to the $I_N$ value of the initial feed containing catalytic slurry oil. In other words, even when the amount of deasphalter residue (or rock) generated by a solvent deasphalting process performed on a feed containing catalytic slurry oil is less than 30 wt % relative to the feed, or less than 20 wt %, or less than 10 wt %, or less than 6 wt % (such as down to 1 wt % or less), the deasphalting process can still generate a deasphalted oil with an $I_N$ value of less than 50, or less than 40, or less than 30 (such as down to 10 or less).

In some aspects, the amount of lift or yield of deasphalted oil from solvent deasphalting can be selected to generate a deasphalted oil having a $S_{BN}$ of about 80 or more, or about 85 or more, or about 90 or more, such as up to about 150 or still higher.

The deasphalted oil produced by solvent deasphalting can also have a reduced asphaltene content and/or reduced micro carbon residue (MCR) content relative to the feed. For example, for a feed that is substantially composed of catalytic slurry oil, such as a feed containing at least 60 wt % of a catalytic slurry oil, or at least 75 wt %, in some aspects the n-heptane insolubles (asphaltene) content of the feed can be about 0.3 wt % or more, or about 1.0 wt % or more, or about 3.0 wt % or more, or about 5.0 wt % or more, such as up to about 10 wt % or possibly still higher. After solvent deasphalting, the amount of n-heptane insolubles can be about 0.2 wt % or less, or about 0.1 wt % or less, or about 0.05 wt % or less, such as down to 0.01 wt % or still lower. More generally, for a feed containing at least 10 wt % catalytic slurry oil, a ratio of the weight percent of n-heptane insolubles in the deasphalted oil relative to the weight percent of n-heptane insolubles in the feed can be about 0.5 or less, or about 0.3 or less, or about 0.1 or less, such as down to about 0.01 or still lower. Additionally or alternately, for a feed that is substantially composed of catalytic slurry oil, such as a feed containing at least 60 wt % of a catalytic slurry oil, or at least 75 wt %, in some aspects the MCR content of the feed can be about 8.0 wt % or more, or about 10 wt % or more, such as up to about 16 wt % or possibly still higher. After solvent deasphalting, the MCR content can be about 7.0 wt % or less, or about 5.0 wt % or less, such as down to 0.1 wt % or still lower. More generally, for a feed containing at least 10 wt % catalytic slurry oil, a ratio of the MCR content in the deasphalted oil relative to the MCR content in the feed can be about 0.8 or less, or about 0.6 or less, or about 0.4 or less, such as down to about 0.1 or still lower.

It is noted that the MCR content in MCB DAO is comprised largely of molecules boiling between about 750° F. (~399° C.) and about 1050° F. (~566° C.). This type of MCR is unusual. Without being bound by any particular theory, it has been discovered that this unusual MCR may not continue to fully correspond to MCR when an MCB DAO is blended with another heavy feed fraction. As an example, an MCB DAO with a MCR of 7 is blended 50:50 with a virgin vacuum gasoil with an MCR of 0.2. The MCR of the blend is <0.5. The MCR in the blend is significantly less than the sum of the MCR in the two feedstocks.

In aspects where the feedstock to solvent deasphalting includes a portion of a cracked feed, the feedstock to solvent deasphalting can have an aromatic carbon content that corresponds to about 30 wt % or more of the total carbons in the feedstock, or about 40 wt % or more, or about 50 wt % or more, or about 60 wt % or more, such as up to about 85 wt %. For example, the aromatic carbon content can be 30 wt % to 85 wt %, or 40 wt % to 85 wt %, or 40 wt % to 60 wt %, or 50 wt % to 75 wt %. After solvent deasphalting, the resulting deasphalted oil can have an aromatic carbon content that corresponds to about 20 wt % or more of the total carbons in the feedstock, or about 30 wt % or more, or about 40 wt % or more, or about 50 wt % or more, such as up to about 75 wt %. For example, the aromatic carbon content can be 20 wt % to 75 wt %, or 30 wt % to 75 wt %, or 30 wt % to 50 wt %, or 40 wt % to 65 wt %.

Solvent deasphalting of a cracked feed (such as a catalytic slurry oil) and/or a feedstock including a substantial portion of cracked feed can also generate a deasphalted oil with an unexpectedly low API gravity. In various aspects, the API gravity at 15° C. of a deasphalted oil derived (at least in part) from a cracked feed can be 0 or less, or -2.0 or less, or -5.0 or less, such as down to -15 or still lower. The hydrogen content of a desaphalted oil derived from a catalytic slurry oil can also be low. For example, the hydrogen content of such a deasphalted oil can be about 7.5 wt % or less, or about 7.35 wt % or less, or about 7.0 wt % or less, such as down to 6.3 wt % or still lower. The $S_{BN}$ of a deasphalted oil derived (at least in part) from a catalytic slurry oil can be about 80 or more, or about 90 or more, or about 100 or more. The corresponding $I_N$ can optionally be 30 or more.

Solvent deasphalting also generates a deasphalter residue or rock fraction. The rock generated from solvent deasphalting can be used, for example, as a feed for a coker. In some aspects, it has been unexpectedly discovered that the net MCR content of the deasphalted oil and the rock fraction can be less than the MCR content of the initial feed. In such aspects, a ratio of the combined MCR content in the deasphalted oil and residual fraction relative to the MCR content in the feed can be about 0.8 or less, or about 0.7 or less, or about 0.6 or less, such as down to about 0.4 or still lower. The rock generated from deasphalting a feed containing a catalytic slurry oil can have an unusually low hydrogen content. For example, for solvent deasphalting under conditions suitable for producing at least 80 wt % of deasphalted oil from a feed containing catalytic slurry oil, or at least 85 wt % of deasphalted oil, or at least 90 wt % of deasphalted oil, the corresponding rock can have a hydrogen content of 5.7 wt % or less, or 5.5 wt % or less, or 5.4 wt % or less, or 5.3 wt % or less, such as down to 5.0 wt % or still lower. The micro carbon residue content of the rock can be about 50 wt % or more, or about 55 wt % or more, or about 60 wt % or more, such as up to about 70 wt % or still higher.

It is noted that high lift (i.e., high DAO yield) deasphalting can tend to produce deasphalter rock of lower quality than the typical rock from conventional deasphalting. The properties of high lift deasphalter rock can be improved by including about 10 wt % or more of a cracked component in the feed to deasphalting. Cracked components such as catalytic slurry oil, coker gas oil, steam cracker tar, coal tar, and/or visbreaker gas oil can correspond to fractions where a substantial portion of the fraction has a distillation point below 566° C. As a result, even under high lift deasphalting conditions, a portion of the deasphalter rock generated from cracked components has a distillation point below 566° C. This can improve various properties of the rock to allow for introduction into a coker. In various aspects, at least 5 wt % of the rock generated by high lift deasphalting can have a distillation point of 566° C. or less, or at least 10 wt %, or at least 15 wt %, or at least 20 wt %, such as up to 30 wt % or still higher.

Due to the separation of catalyst fines into the deasphalter rock, the rock fraction can also contain an elevated content of catalyst fines. In various aspects, the rock fraction can contain about 100 wppm of catalyst fines or more, or about 200 wppm or more, or about 500 wppm or more.

During solvent deasphalting, the feed to a deasphalting unit can be mixed with a solvent. Portions of the feed that are soluble in the solvent are then extracted, leaving behind a residue with little or no solubility in the solvent. The portion of the deasphalted feedstock that is extracted with the solvent is often referred to as deasphalted oil. Typical solvent deasphalting conditions include mixing a feedstock fraction with a solvent in a weight ratio of from about 1:2 to about 1:10, such as about 1:8 or less. Typical solvent deasphalting temperatures range from 40° C. to 200° C., or 40° C. to 150° C., depending on the nature of the feed and the solvent. The pressure during solvent deasphalting can be from about 50 psig (~345 kPag) to about 1000 psig (~6900 kPag).

It is noted that the above solvent deasphalting conditions represent a general range, and the conditions will vary depending on the feed. For example, under typical deasphalting conditions, increasing the temperature can tend to reduce the yield while increasing the quality of the resulting deasphalted oil. Under typical deasphalting conditions, increasing the molecular weight of the solvent can tend to increase the yield while reducing the quality of the resulting deasphalted oil, as additional compounds within a resid fraction may be soluble in a solvent composed of higher molecular weight hydrocarbons. Under typical deasphalting conditions, increasing the amount of solvent can tend to increase the yield of the resulting deasphalted oil. As understood by those of skill in the art, the conditions for a particular feed can be selected based on the resulting yield of deasphalted oil from solvent deasphalting. In various aspects, the yield of deasphalted oil from solvent deasphalting with a $C_{4+}$ solvent can be at least 50 wt % relative to the weight of the feed to deasphalting, or at least 60 wt %, or at least 65 wt %, or at least 70 wt %, such as up to 95 wt % or more. In aspects where the feed to deasphalting includes a gas oil boiling range portion, such as gas oil boiling range portions due to the presence of one or more cracked components within the feed, the yield from solvent deasphalting can be characterized based on a yield by weight of a 950° F.+(510° C.) portion of the deasphalted oil relative to the weight of a 510° C.+ portion of the feed. In such aspects where a $C_{4+}$ solvent is used, the yield of 510° C.+ deasphalted oil from solvent deasphalting can be at least 40 wt % relative to the weight of the 510° C.+ portion of the feed to deasphalting, or at least 50 wt %, or at least 60 wt % or at least 65 wt %, or at least 70 wt % (such as up to 95 wt % or more). Additionally or alternately, the total yield can be at least 80 wt %, or at least 90 wt %, or at least 96 wt % (such as up to 99 wt % or more).

Fluidized Coking and Delayed Coking

Conventionally, coking is typically used to process a vacuum resid, or a portion of a vacuum resid. By contrast, in various aspects, the feed to a coker can correspond to deasphalter rock generated by a high lift deasphalting process.

Typical configurations for coking can include fluidized coking and delayed coking. Fluidized coking is a refinery process in which a heavy petroleum feedstock, typically a non-distillable residue (resid) from atmospheric and/or vacuum fractionation, is converted to lighter, more valuable materials by thermal decomposition (coking) at temperatures from about 900° F. (482° C.) to about 1100° F. (593° C.). Conventional fluid coking is performed in a process unit comprised of a coking reactor and a heater or burner. A petroleum feedstock is injected into the reactor in a coking zone comprised of a fluidized bed of hot, fine, coke particles and is distributed relatively uniformly over the surfaces of the coke particles where it is cracked to vapors and coke. The vapors pass through a gas/solids separation apparatus, such as a cyclone, which removes most of the entrained coke particles. The vapor is then discharged into a scrubbing zone where the remaining coke particles are removed and the products cooled to condense the heavy liquids. The balance of the vapors go to a fractionator for separation of the gases and the liquids into different boiling fractions.

During conventional operation, the resulting slurry (which usually contains from about 1 to about 3 wt. % coke particles) is recycled to extinction to the coking zone. Instead of recycling the heavy liquids in this slurry, at least a portion of the heavy liquids can instead be combined with a catalytic slurry oil and/or a vacuum resid fraction for use as a feed to a hydrotreater (or another hydroprocessing unit). Optionally but preferably, the combined feed can be deasphalted prior to hydrotreatment.

Some of the coke particles in the coking zone flow downwardly to a stripping zone at the base of the reactor vessel where steam removes interstitial product vapors from, or between, the coke particles, and some adsorbed liquids from the coke particles. The coke particles then flow down a stand-pipe and into a riser that moves them to a burning, or heating zone, where sufficient air is injected to burn at least a portion of the coke and heating the remainder sufficiently to satisfy the heat requirements of the coking zone where the unburned hot coke is recycled. Net coke, above that consumed in the burner, is withdrawn as product coke.

Another type of fluid coking employs three vessels: a coking reactor, a heater, and a gasifier. Coke particles having carbonaceous material deposited thereon in the coking zone are passed to the heater where a portion of the volatile matter is removed. The coke is then passed to the gasifier where it reacts, at elevated temperatures, with air and steam to form a mixture of carbon monoxide, carbon dioxide, methane, hydrogen, nitrogen, water vapor, and hydrogen sulfide. The gas produced in the gasifier is passed to the heater to provide part of the reactor heat requirement. The remainder of the heat is supplied by circulating coke between the gasifier and the heater. Coke is also recycled from the heater to the coking reactor to supply the heat requirements of the reactor.

The rate of introduction of resid feedstock to a fluid coker is limited by the rate at which it can be converted to coke. The major reactions that produce coke involve cracking of aliphatic side chains from aromatic cores, demethylation of aromatic cores and aromatization. The rate of cracking of aliphatic side chains is relatively fast and results in the buildup of a sticky layer of methylated aromatic cores. This layer is relatively sticky at reaction temperature. The rate of de-methylation of the aromatic cores is relatively slow and limits the operation of the fluid coker. At the point of fluid bed bogging (defluidizing), the rate of sticky layer going to coke equals the rate of introduction of coke precursors from the resid feed. An acceleration of the reactions involved in converting the sticky material to dry coke would allow increased reactor throughput at a given temperature or coking at a lower temperature at constant throughput. Less gas and higher quality liquids are produced at lower coking temperatures. Sticky coke particles can agglomerate (become larger) and be carried under into the stripper section and cause fouling. When carried under, much of the sticky coke is sent to the burner, where this incompletely demethylated coke evolves methylated and unsubstituted aromatics via thermal cracking reactions that ultimately cause fouling and/or foaming problems in the acid gas clean-up units.

Figure 6:
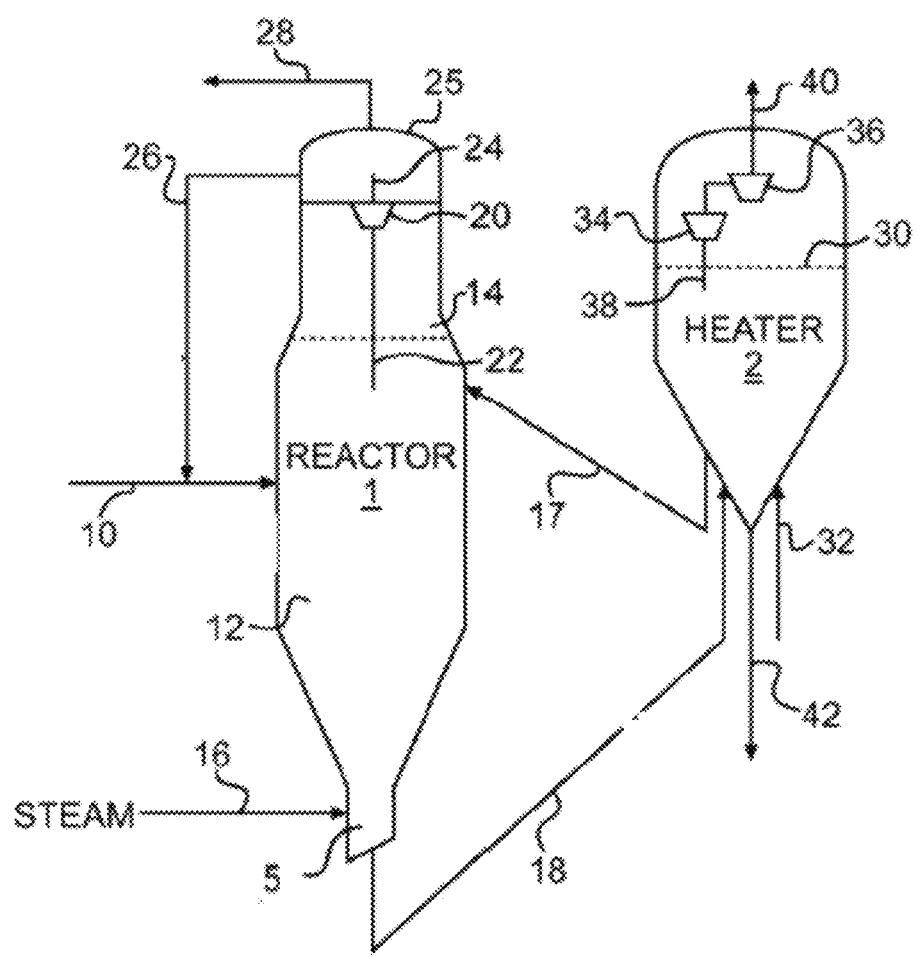
FIG. 6 schematically shows an example of a coker.

Reference is now made to FIG. 6 hereof which shows a simplified flow diagram of a typical fluidized coking process unit comprised of a coking reactor and a heater. A heavy hydrocarbonaceous chargestock is conducted via line 10 into coking zone 12 that contains a fluidized bed of solids having an upper level indicated at 14. Although it is preferred that the solids, or seed material, be coke particles, they may also be any other refractory materials such as those selected from the group consisting of silica, alumina, zirconia, magnesia, alundum or mullite, synthetically prepared or naturally occurring material such as pumice, clay, kieselguhr, diatomaceous earth, bauxite, and the like. The solids will have an average particle size of about 40 to 1000 microns, preferably from about 40 to 400 microns. For purposes of this FIG. 7, the solid particles will be referred to coke, or coke particles.

A fluidizing gas e.g., steam, is introduced at the base of coker reactor 1, through line 16, in an amount sufficient to obtained superficial fluidizing velocity in the range of about 0.5 to 5 feet/second (0.15 to 1.5 m/s). Coke at a temperature above the coking temperature, for example, at a temperature from about 100° F. (38° C.) to about 400° F. (204° C.), preferably from about 150° F. (65° C.) to about 350° F. (177° C.), and more preferably from about 150° F. (65° C.) to 250° F. (121), in excess of the actual operating temperature of the coking zone is admitted to reactor 1 by line 17 from heater 2 in an amount sufficient to maintain the coking temperature in the range of about 850° F. (454° C.) to about 1200° F. (650° C.). The pressure in the coking zone is maintained in the range of about 0 to 150 psig (1030 kPag), preferably in the range of about 5 psig (34 kPag) to 45 psig (310 kPag). The lower portion of the coking reactor serves as a stripping zone 5 in which occluded hydrocarbons are removed from the coke by use of a stripping agent, such as steam, as the coke particles move through the stripping zone. A stream of stripped coke is withdrawn from the stripping zone 5 via line 18 and conducted to heater 2. Conversion products of the coking zone are passed through cyclone(s) 20 where entrained solids are removed and returned to coking zone 12 via dipleg 22. The resulting vapors exit cyclone 20 via line 24, and pass into a scrubber 25 mounted at the top of the coking reactor 1. The vapors passed into scrubber 25 are cooled and the heaviest components can be condensed. If desired, a stream of heavy materials condensed in the scrubber may be recycled to the coking reactor via line 26. Additionally or alternately, at least a portion of the heaviest components from the scrubber can be combined with a catalytic slurry oil for use as a feed for deasphalting and subsequent hydrotreating. Coker conversion products are removed from scrubber 25 via line 28 for fractionation in a conventional manner. In heater 2, stripped coke from coking reactor 1 (cold coke) is introduced via line 18 into a fluidized bed of hot coke having an upper level indicated at 30. The bed is heated by passing a fuel gas and/or air into the heater via line 32. The gaseous effluent of the heater, including entrained solids, passes through one or more cyclones which may include first cyclone(s) 34 and second cyclone(s) 36 wherein the separation of the larger entrained solids occur. The separated larger solids are returned to the heater via cyclone diplegs 38. The heated gaseous effluent that contains entrained solids is removed from heater 2 via line 40. Excess coke can be removed from heater 2 via line 42. A portion of hot coke is removed from the fluidized bed in heater 2 and recycled to coking reactor 1 via line 17 to supply heat to the coking zone. Although a gasifier can also be present as part of a coking reaction system, a gasifier is not shown in FIG. 6.

Delayed coking is another process suitable for the thermal conversion of heavy oils such as petroleum residua (also referred to as "resid") to produce liquid and vapor hydrocarbon products and coke. Delayed coking of resids from heavy and/or sour (high sulfur) crude oils is carried out by converting part of the resids to more valuable hydrocarbon products. The resulting coke has value, depending on its grade, as a fuel (fuel grade coke), electrodes for aluminum manufacture (anode grade coke), etc.

Generally, a residue fraction, such as a petroleum residuum feed is pumped to a pre-heater at a pressure of about 50 psig (345 kPag) to about 550 psig (3.7 MPag), where it is pre-heated to a temperature from about 480° C. to about 520° C. The pre-heated feed is conducted to a coking zone, typically a vertically-oriented, insulated coker vessel, e.g., drum, through an inlet at the base of the drum. Pressure in the drum is usually relatively low, such as about 15 psig (103 kPag) to about 80 psig (551 kPag) to allow volatiles to be removed overhead. Typical operating temperatures of the drum will be between about 410° C. and about 475° C. The hot feed thermally cracks over a period of time (the "coking time") in the coker drum, liberating volatiles composed primarily of hydrocarbon products that continuously rise through the coke mass and are collected overhead. The volatile products are conducted to a coker fractionator for distillation and recovery of coker gases, gasoline boiling range material such as coker naphtha, light gas oil, and heavy gas oil. In an embodiment, a portion of the heavy coker gas oil present in the product stream introduced into the coker fractionator can be captured for recycle and combined with the fresh feed (coker feed component), thereby forming the coker heater or coker furnace charge (i.e., coker bottoms). Additionally or alternately, such a portion of the heavy coker gas oil can be combined with a catalytic slurry oil for use as a feed for optional deasphalting and subsequent hydrotreatment. In addition to the volatile products, the process also results in the accumulation of coke in the drum. When the coker drum is full of coke, the heated feed is switched to another drum and hydrocarbon vapors are purged from the coke drum with steam. The drum is then quenched with water to lower the temperature, after which the water is drained. When the cooling step is complete, the drum is opened and the coke is removed by drilling and/or cutting using high velocity water jets. The coke removal step is frequently referred to as "decoking".

Conventional coke processing aids can be used, including the use of antifoaming agents. The process is compatible with processes which use air-blown feed in a delayed coking process operated at conditions that will favor the formation of isotropic coke.

The volatile products from the coker drum are conducted away from the process for further processing. For example, volatiles can be conducted to a coker fractionator for distillation and recovery of coker gases, coker naphtha, light gas oil, and heavy gas oil. Such fractions can be used, usually but not always following upgrading, in the blending of fuel and lubricating oil products such as motor gasoline, motor diesel oil, fuel oil, and lubricating oil. Upgrading can include separations, heteroatom removal via hydrotreating and non-hydrotreating processes, de-aromatization, solvent extraction, and the like. Conventionally, at least a portion of the heavy coker gas oil present in the product stream introduced into the coker fractionator is captured for recycle and combined with the fresh feed (coker feed component), thereby forming the coker heater or coker furnace charge. The combined feed ratio ("CFR") is the volumetric ratio of furnace charge (fresh feed plus recycle oil) to fresh feed to the continuous delayed coker operation. Delayed coking operations typically employ recycles of about 5 vol. % to about 25 vol. % (CFRs of about 1.05 to about 1.25). In various aspects, instead of using this bottoms from the liquid product as a recycled portion of the feed to the coker, the coker bottoms can be used as a feed for optional deasphalting and hydrotreatment after combination with a catalytic slurry oil.

In an embodiment, pressure during pre-heat ranges from about 50 psig (345 kPag) to about 550 psig (3.8 MPag), and pre-heat temperature ranges from about 480° C. to about 520° C. Coking pressure in the drum ranges from about 15 psig (101 kPag) to about 80 psig (551 kPag), and coking temperature ranges from about 410° C. and 475° C. The coking time ranges from about 0.5 hour to about 24 hours.

Hydroprocessing of Deasphalted Oil

After any deasphalting, the deasphalted oil (and any additional fractions combined with the deasphalted oil) can undergo further processing to form a hydroprocessed effluent. This can include hydrotreatment and/or hydrocracking to remove heteroatoms (such as sulfur and/or nitrogen) to desired levels, reduce micro carbon residue content, and/or provide viscosity index (VI) uplift. Additionally or alternately, the hydroprocessing can be performed to achieve a desired level of conversion of higher boiling compounds in the feed to fuels boiling range compounds, although such conversion to fuel boiling range compounds can preferably produce a limited amount of naphtha boiling range compounds. Depending on the aspect, a deasphalted oil can be hydroprocessed by demetallization, hydrotreating, aromatic saturation, hydrocracking, or a combination thereof.

In some aspects, the deasphalted oil can be hydrotreated and/or hydrocracked with little or no solvent extraction being performed prior to and/or after the deasphalting. As a result, the deasphalted oil for hydrotreatment and/or hydrocracking can have a substantial aromatics content. In various aspects, the aromatics content of the deasphalted oil can be at least 50 wt %, or at least 55 wt %, or at least 60 wt %, or at least 65 wt %, or at least 70 wt %, or at least 75 wt %, such as up to 90 wt % or more. Additionally or alternately, the saturates content of the deasphalted oil can be 50 wt % or less, or 45 wt % or less, or 40 wt % or less, or 35 wt % or less, or 30 wt % or less, or 25 wt % or less, such as down to 10 wt % or less. In this discussion and the claims below, the aromatics content and/or the saturates content of a fraction can be determined based on ASTM D7419.

Hydroprocessing can also result in a substantial increase in the API gravity of the $C_{5+}$ portion of the hydroprocessed effluent relative to the API gravity of the deasphalted oil and/or a feedstock that includes the deasphalted oil. In various aspects, the API gravity at 15° C. of the $C_{5+}$ portion of the hydroprocessed effluent can be about 15 or more greater than the API gravity of the deasphalted oil (or other input feedstock to hydroprocessing), or 17 or more greater, or 20 or more greater. This increase in API gravity can be roughly indicative of the amount of hydrogen added to the feedstock during hydroprocessing. Generally, for each addition of about 100-150 SCF/bbl (~17 to ~26 $m^3/m^3$) of hydrogen during hydroprocessing, the API gravity of the $C_{5+}$ portion of a hydroprocessed effluent can increase by 1 relative to the feed. Thus, specifying an increase in API gravity of the hydroprocessed effluent of 15 or more relative to the feedstock corresponds to hydroprocessing under conditions that are suitable for addition of roughly 1500 SCF/bbl (~260 $m^3/m^3$) or more of hydrogen to the feedstock.

The reaction conditions during demetallization and/or hydrotreatment and/or hydrocracking of the deasphalted oil can be selected to generate a desired level of conversion of a feed. Any convenient type of reactor, such as fixed bed (for example trickle bed) reactors can be used. Conversion of the feed can be defined in terms of conversion of molecules that boil above a temperature threshold to molecules below that threshold. The conversion temperature can be any convenient temperature, such as ~700° F. (370° C.) or ~1050° F. (566° C.). The amount of conversion can correspond to the total conversion of molecules within the combined hydrotreatment and hydrocracking stages for the deasphalted oil. Suitable amounts of conversion of molecules boiling above 1050° F. (566° C.) to molecules boiling below 566° C. include 30 wt % to 100 wt % conversion relative to 566° C., or 30 wt % to 90 wt %, or 30 wt % to 70 wt %, or 40 wt % to 90 wt %, or 40 wt % to 80 wt %, or 40 wt % to 70 wt %, or 50 wt % to 100 wt %, or 50 wt % to 90 wt %, or 50 wt % to 70 wt %. In particular, the amount of conversion relative to 566° C. can be 30 wt % to 100 wt %, or 50 wt % to 100 wt %, or 40 wt % to 90 wt %. Additionally or alternately, suitable amounts of conversion of molecules boiling above ~700° F. (370° C.) to molecules boiling below 370° C. include 10 wt % to 70 wt % conversion relative to 370° C., or 10 wt % to 60 wt %, or 10 wt % to 50 wt %, or 20 wt % to 70 wt %, or 20 wt % to 60 wt %, or 20 wt % to 50 wt %, or 30 wt % to 70 wt %, or 30 wt % to 60 wt %, or 30 wt % to 50 wt %. In particular, the amount of conversion relative to 370° C. can be 10 wt % to 70 wt %, or 20 wt % to 50 wt %, or 30 wt % to 60 wt %.

The hydroprocessed deasphalted oil effluent can also be characterized based on the product quality. In some aspects, prior to hydroprocessing, the deasphalted oil (and/or the feedstock containing the deasphalted oil) can have an organic sulfur content of 1.0 wt % or more, or 2.0 wt % or more. After hydroprocessing (hydrotreating and/or hydrocracking), the liquid ($C_3$+) portion of the hydroprocessed deasphalted oil can have an organic sulfur content of about 5000 wppm (0.5 wt %) or less, or about 1000 wppm or less, or about 500 wppm or less, or about 100 wppm or less (such as down to ~0 wppm). Additionally or alternately, the hydroprocessed deasphalted oil can have a nitrogen content of 200 wppm or less, or 100 wppm or less, or 50 wppm or less (such as down to ~0 wppm). Additionally or alternately, the liquid ($C_3$+) portion of the hydroprocessed deasphalted oil can have a MCR content and/or Conradson Carbon residue content of 2.5 wt % or less, or 1.5 wt % or less, or 1.0 wt % or less, or 0.7 wt % or less, or 0.1 wt % or less, or 0.02 wt % or less (such as down to ~0 wt %). MCR content and/or Conradson Carbon residue content can be determined according to ASTM D4530. Further additionally or alternately, the effective hydroprocessing conditions can be selected to allow for reduction of the n-heptane asphaltene content of the liquid ($C_3$+) portion of the hydroprocessed deasphalted oil to less than about 1.0 wt %, or less than about 0.5 wt %, or less than about 0.1 wt %, and optionally down to substantially no remaining n-heptane asphaltenes. The hydrogen content of the liquid ($C_3+$) portion of the hydroprocessed deasphalted oil can be at least about 10.5 wt %, or at least about 11.0 wt %, or at least about 11.5 wt %, such as up to about 13.5 wt % or more.

In aspects where hydroprocessing is performed on the combined catalytic slurry oil and coker bottoms without prior deasphalting, the $I_N$ of the hydroprocessed effluent can be at least 10 lower than the $I_N$ of the deasphalted oil prior to hydroprocessing, or at least 20 lower.

The $I_N$ of the liquid ($C_3+$) portion of the hydroprocessed deasphalted oil can be about 75 or less, or about 60 or less, or about 50 or less, or about 40 or less, or about 25 or less, such as down to about 20, or down to about 0. In particular, the $I_N$ can be about 20 to about 75, or about 0 to about 60, or about 20 to about 50, or about 0 to about 75, or about 0 to about 40. Typical deasphalted oils have an $I_N$ value of <20. Deasphalting can selectively remove high $I_N$ molecules, while allowing the deasphalted oil to maintain a relatively high $S_{BN}$ value. A deasphalted oil derived from a catalytic slurry oil can have has an $S_{BN}$ of 150 to 200. A typical coker bottoms stream can have an $S_{BN}$ between 90 and 120. Deaspahlted oils derived from conventional vacuum resid fractions can have $S_{BN}$ values in a range from ~40 (from a waxy paraffinic vac resid) to ~150 (from a heavy oil vac resid). In some aspects, the deasphalted oils described herein, derived from a catalytic slurry oil in combination with coker bottoms and/or vacuum resid, can have an $S_{BN}$ of >120 and an $I_N$ of <20. At typical hydroprocessing conditions for hydroprocessing of a conventional deasphalted oil, $I_N$ will increase and $S_{BN}$ will decrease during the course of hydroprocessing. For a conventional heavy feed with a relatively small gap between $S_{BN}$ and $I_N$, this convergence of $S_{BN}$ and $I_N$ values during hydroprocessing can lead to precipitation of asphaltenes and/or coking of catalyst if even modest levels of feed conversion are performed. However, because of the unexpected discovery of the ability to use catalytic slurry oil and/or coker bottoms (optionally with vacuum resid) to form deasphalted oils with high $S_{BN}$ values in combination with low $I_N$ values, the deasphalted oils can be hydroprocessed at high levels of feed conversion without causing reactor plugging and/or fouling. In particular, the hydroprocessed deasphalted oils described herein can have $S_{BN}$ values of about 90 to about 140 while having $I_N$ values of 0 to about 70. It is noted that due to the desire to maintain a high $S_{BN}$ value in the deasphalted oil, heavier vacuum resid fractions can in some instances be preferable for use in the feed to deasphalting.

After hydroprocessing, the liquid ($C_3+$) portion of the hydroprocessed deasphalted oil can have a volume of at least about 95% of the volume of the corresponding feed to hydroprocessing, or at least about 100% of the volume of the feed, or at least about 105%, or at least about 110%, such as up to about 150% of the volume. In particular, the yield of $C_3+$ liquid products can be about 95 vol % to about 150 vol %, or about 110 vol % to about 150 vol %. Optionally, the $C_3$ and $C_4$ hydrocarbons can be used, for example, to form liquefied propane or butane gas as a potential liquid product. Therefore, the $C_3+$ portion of the effluent can be counted as the "liquid" portion of the effluent product, even though a portion of the compounds in the liquid portion of the hydrotreated effluent may exit the hydrotreatment reactor (or stage) as a gas phase at the exit temperature and pressure conditions for the reactor.

In some aspects, the portion of the hydroprocessed effluent having a boiling range/distillation point of less than about 700° F. (~371° C.) can be used as a low sulfur fuel oil or blendstock for low sulfur fuel oil. In other aspects, such a portion of the hydroprocessed effluent can be used (optionally with other distillate streams) to form ultra low sulfur naphtha and/or distillate (such as diesel) fuel products, such as ultra low sulfur fuels or blendstocks for ultra low sulfur fuels. The portion having a boiling range/distillation point of at least about 700° F. (~371° C.) can be used as an ultra low sulfur fuel oil having a sulfur content of about 0.1 wt % or less or optionally blended with other distillate or fuel oil streams to form an ultra low sulfur fuel oil or a low sulfur fuel oil. In some aspects, at least a portion of the liquid hydrotreated effluent having a distillation point of at least about ~371° C. can be used as a feed for FCC processing. In still other aspects, the portion having a boiling range/distillation point of at least about 371° C. can be used as a feedstock for lubricant base oil production.

Optionally, a feed can initially be exposed to a demetallization catalyst prior to exposing the feed to a hydrotreating catalyst. Deasphalted oils can have metals concentrations (Ni+V+Fe) on the order of 10-100 wppm. A combined catalytic slurry oil/coker bottoms feed (optionally including other cracked feed components) can include still higher levels of metals. Exposing a conventional hydrotreating catalyst to a feed having a metals content of 10 wppm or more can lead to catalyst deactivation at a faster rate than may be desirable in a commercial setting. Exposing a metal containing feed to a demetallization catalyst prior to the hydrotreating catalyst can allow at least a portion of the metals to be removed by the demetallization catalyst, which can reduce or minimize the deactivation of the hydrotreating catalyst and/or other subsequent catalysts in the process flow. Commercially available demetallization catalysts can be suitable, such as large pore amorphous oxide catalysts that may optionally include Group VI and/or Group VIII non-noble metals to provide some hydrogenation activity.

In various aspects, the deasphalted oil can be exposed to a hydrotreating catalyst under effective hydrotreating conditions. The catalysts used can include conventional hydroprocessing catalysts, such as those comprising at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å (as determined by ASTM D4284); a surface area (as measured by the BET method) from 100 to 300 $m^2/g$, or 150 to 250 $m^2/g$; and a pore volume of from 0.25 to 1.0 $cm^3/g$, or 0.35 to 0.8 $cm^3/g$. More generally, any convenient size, shape, and/or pore size distribution for a catalyst suitable for hydrotreatment of a distillate (including lubricant base stock) boiling range feed in a conventional manner may be used. Preferably, the support or carrier material is an amorphous support, such as a refractory oxide. Preferably, the support or carrier material can be free or substantially free of the presence of molecular sieve, where substantially free of molecular sieve is defined as having a content of molecular sieve of less than about 0.01 wt %.

The at least one Group VIII non-noble metal, in oxide form, can typically be present in an amount ranging from about 2 wt % to about 40 wt %, preferably from about 4 wt % to about 15 wt %. The at least one Group VI metal, in oxide form, can typically be present in an amount ranging from about 2 wt % to about 70 wt %, preferably for supported catalysts from about 6 wt % to about 40 wt % or from about 10 wt % to about 30 wt %. These weight percents are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydroprocessing is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to herein, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane). The treat gas stream introduced into a reaction stage will preferably contain at least about 50 vol. % and more preferably at least about 75 vol. % hydrogen. Optionally, the hydrogen treat gas can be substantially free (less than 1 vol %) of impurities such as $H_2S$ and $NH_3$ and/or such impurities can be substantially removed from a treat gas prior to use.

Hydrogen can be supplied at a rate of from about 100 SCF/B (standard cubic feet of hydrogen per barrel of feed) (17 $Nm^3/m^3$) to about 10000 SCF/B (1700 $Nm^3/m^3$). Preferably, the hydrogen is provided in a range of from about 2000 SCF/B (340 $Nm^3/m^3$) to about 10000 SCF/B (1700 $Nm^3/m^3$). Hydrogen can be supplied co-currently with the input feed to the hydrotreatment reactor and/or reaction zone or separately via a separate gas conduit to the hydrotreatment zone.

The effective hydrotreating conditions can optionally be suitable for incorporation of a substantial amount of additional hydrogen into the hydrotreated effluent. During hydrotreatment, the consumption of hydrogen by the feed in order to form the hydrotreated effluent can correspond to at least about 1500 SCF/bbl (~260 $Nm^3/m^3$) of hydrogen, or at least about 1700 SCF/bbl (~290 $Nm^3/m^3$), or at least about 2000 SCF/bbl (~330 $Nm^3/m^3$), or at least about 2200 SCF/bbl (~370 $Nm^3/m^3$), such as up to about 5000 SCF/bbl (~850 $Nm^3/m^3$) or more. In particular, the consumption of hydrogen can be about 1500 SCF/bbl (~260 $Nm^3/m^3$) to about 5000 SCF/bbl (~850 $Nm^3/m^3$), or about 2000 SCF/bbl (~340 $Nm^3/m^3$) to about 5000 SCF/bbl (~850 $Nm^3/m^3$), or about 2200 SCF/bbl (~370 $Nm^3/m^3$) to about 5000 SCF/bbl (~850 $Nm^3/m^3$).

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag), or about 2.9 MPag to about 13.9 MPag (~400 to ~2000 psig); liquid hourly space velocities (LHSV) of 0.1 $hr^{-1}$ to 10 $hr^{-1}$, or 0.1 $hr^{-1}$ to 5.0 $hr^{-1}$; and a hydrogen treat gas rate of from about 430 to about 2600 $Nm^3/m^3$ (~2500 to ~15000 SCF/bbl), or about 850 to about 1700 $Nm^3/m^3$ (~5000 to ~10000 SCF/bbl).

In various aspects, the deasphalted oil can be exposed to a hydrocracking catalyst under effective hydrocracking conditions. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophosphates. One example of suitable zeolite is USY, such as a USY zeolite with cell size of 24.30 Angstroms or less. Additionally or alternately, the catalyst can be a low acidity molecular sieve, such as a USY zeolite with a Si to Al ratio of at least about 20, and preferably at least about 40 or 50. ZSM-48, such as ZSM-48 with a $SiO_2$ to $Al_2O_3$ ratio of about 110 or less, such as about 90 or less, is another example of a potentially suitable hydrocracking catalyst. Still another option is to use a combination of USY and ZSM-48. Still other options include using one or more of zeolite Beta, ZSM-5, ZSM-35, or ZSM-23, either alone or in combination with a USY catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

When only one hydrogenation metal is present on a hydrocracking catalyst, the amount of that hydrogenation metal can be at least about 0.1 wt % based on the total weight of the catalyst, for example at least about 0.5 wt % or at least about 0.6 wt %. Additionally or alternately when only one hydrogenation metal is present, the amount of that hydrogenation metal can be about 5.0 wt % or less based on the total weight of the catalyst, for example about 3.5 wt % or less, about 2.5 wt % or less, about 1.5 wt % or less, about 1.0 wt % or less, about 0.9 wt % or less, about 0.75 wt % or less, or about 0.6 wt % or less. Further additionally or alternately when more than one hydrogenation metal is present, the collective amount of hydrogenation metals can be at least about 0.1 wt % based on the total weight of the catalyst, for example at least about 0.25 wt %, at least about 0.5 wt %, at least about 0.6 wt %, at least about 0.75 wt %, or at least about 1 wt %. Still further additionally or alternately when more than one hydrogenation metal is present, the collective amount of hydrogenation metals can be about 35 wt % or less based on the total weight of the catalyst, for example about 30 wt % or less, about 25 wt % or less, about 20 wt % or less, about 15 wt % or less, about 10 wt % or less, or about 5 wt % or less. In embodiments wherein the supported metal comprises a noble metal, the amount of noble metal(s) is typically less than about 2 wt %, for example less than about 1 wt %, about 0.9 wt % or less, about 0.75 wt % or less, or about 0.6 wt % or less. It is noted that hydrocracking under sour conditions is typically performed using a base metal (or metals) as the hydrogenation metal.

In various aspects, the conditions selected for hydrocracking for lubricant base stock production can depend on the desired level of conversion, the level of contaminants in the input feed to the hydrocracking stage, and potentially other factors. For example, hydrocracking conditions in a single stage, or in the first stage and/or the second stage of a multi-stage system, can be selected to achieve a desired level of conversion in the reaction system. Hydrocracking conditions can be referred to as sour conditions or sweet conditions, depending on the level of sulfur and/or nitrogen present within a feed. For example, a feed with 100 wppm or less of sulfur and 50 wppm or less of nitrogen, preferably less than 25 wppm sulfur and/or less than 10 wppm of nitrogen, represent a feed for hydrocracking under sweet conditions. In various aspects, hydrocracking can be performed on a thermally cracked resid, such as a deasphalted oil derived from a thermally cracked resid. In some aspects, such as aspects where an optional hydrotreating step is used prior to hydrocracking, the thermally cracked resid may correspond to a sweet feed. In other aspects, the thermally cracked resid may represent a feed for hydrocracking under sour conditions.

A hydrocracking process under sour conditions can be carried out at temperatures of about 550° F. (288° C.) to about 840° F. (449° C.), hydrogen partial pressures of from about 1500 psig to about 5000 psig (10.3 MPag to 34.6 MPag), liquid hourly space velocities of from 0.05 to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 $m^3/m^3$ to about 2140 $m^3/m^3$ (1200 SCF/B to 12000 SCF/B). The LHSV can be from about 0.25 $h^{-1}$ to about 50 $h^{-1}$, or from about 0.5 $h^{-1}$ to about 20 $h^{-1}$, preferably from about 1.0 $h^{-1}$ to about 4.0 $h^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as about 350° F. (177° C.) or about 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least about 350° F. (177° C.) or at least about 400° F. (204° C.) to having an upper end cut point temperature of about 700° F. (371° C.) or less or 650° F. (343° C.) or less. Optionally, the distillate fuel range can be extended to include additional kerosene, such as by selecting a lower end cut point temperature of at least about 300° F. (149° C.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant base stocks. In such aspects, the portion boiling above the distillate fuel range is subjected to further hydroprocessing in a second hydroprocessing stage.

A hydrocracking process under sweet conditions can be performed under conditions similar to those used for a sour hydrocracking process, or the conditions can be different. In an embodiment, the conditions in a sweet hydrocracking stage can have less severe conditions than a hydrocracking process in a sour stage. Suitable hydrocracking conditions for a non-sour stage can include, but are not limited to, conditions similar to a first or sour stage. Suitable hydrocracking conditions can include temperatures of about 500° F. (260° C.) to about 840° F. (449° C.), hydrogen partial pressures of from about 1500 psig to about 5000 psig (10.3 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 $m^3/m^3$ to about 1068 $m^3/m^3$ (1200 SCF/B to 6000 SCF/B). The LHSV can be from about 0.25 $h^{-1}$ to about 50 $h^{-1}$, or from about 0.5 $h^{-1}$ to about 20 preferably from about 1.0 $h^{-1}$ to about 4.0 $h^{-1}$.

In still another aspect, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

In yet another aspect, a hydroprocessing reaction system may include more than one hydrocracking stage. If multiple hydrocracking stages are present, at least one hydrocracking stage can have effective hydrocracking conditions as described above, including a hydrogen partial pressure of at least about 1500 psig (10.3 MPag). In such an aspect, other hydrocracking processes can be performed under conditions that may include lower hydrogen partial pressures. Suitable hydrocracking conditions for an additional hydrocracking stage can include, but are not limited to, temperatures of about 500° F. (260° C.) to about 840° F. (449° C.), hydrogen partial pressures of from about 250 psig to about 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions for an additional hydrocracking stage can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 m$^3$/m$^3$ to about 1068 m$^3$/m$^3$ (1200 SCF/B to 6000 SCF/B). The LHSV can be from about 0.25 to about 50 or from about 0.5 h$^{-1}$ to about 20 h$^{-1}$, and preferably from about 1.0 h$^{-1}$ to about 4.0 h$^{-1}$.

Example 1—High Lift Solvent Deasphalting of Vacuum Resid

Figure 2:
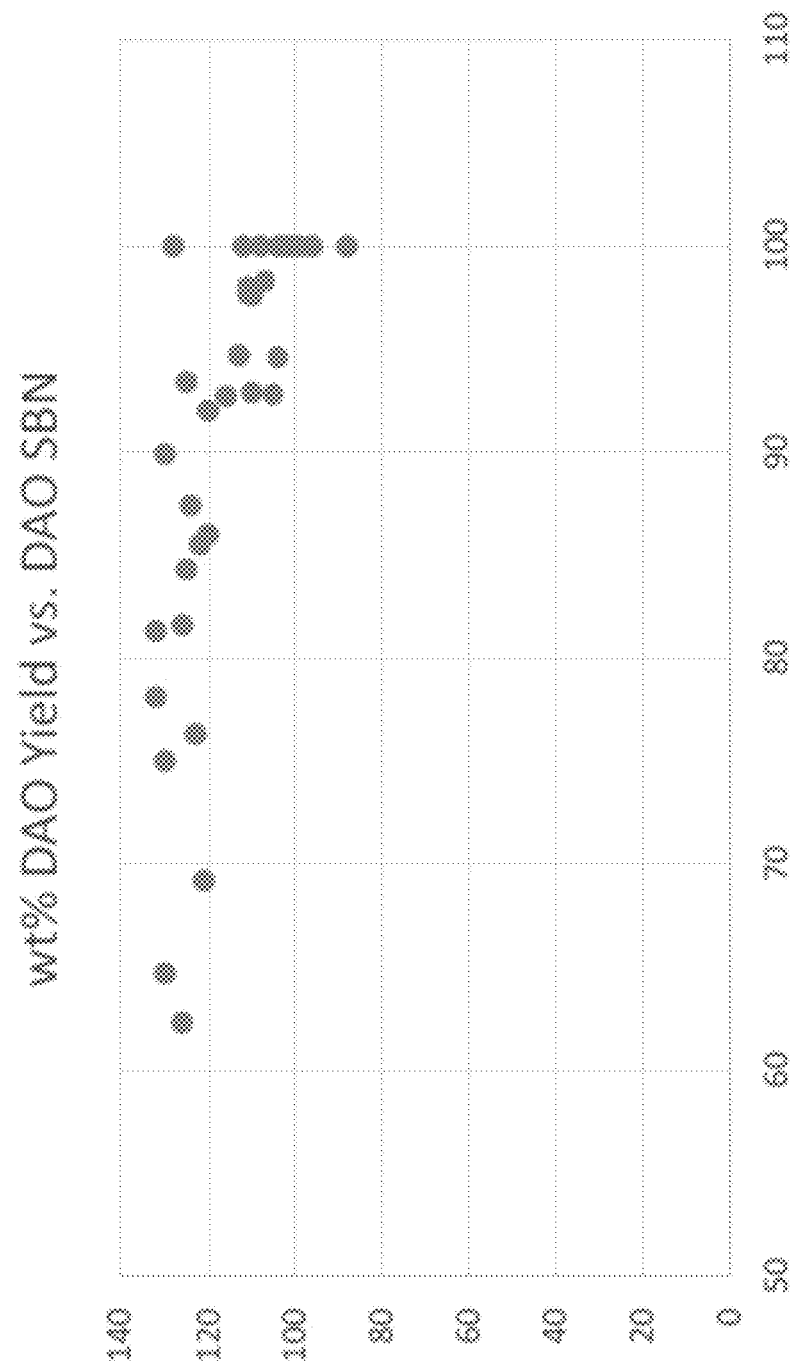
FIG. 2 shows solubility blending number values relative to deasphalted oil yield for deasphalted oils generated by heptane deasphalting of various vacuum resid feeds.

High lift solvent deasphalting was performed on a large number of vacuum resids from various crude sources. The deasphalting was performed using a 5:1 volume ratio of solvent to feed with n-heptane as the solvent. Under the deasphalting conditions, the yield of deasphalting oil varied from about 60 wt % to 100 wt % depending on the vacuum resid. FIG. 2 shows a plot of the yield of deasphalted oil (in wt %) on the x-axis versus the S$_{BN}$ for the resulting deasphalted oil on the y-axis. As shown in FIG. 2, the S$_{BN}$ values for deasphalted oils at yields of roughly 60 wt % to 90 wt % varied within a small range of about 120 to about 132. For the vacuum resid feeds that resulted in close to 100% deasphalted oil yield (in other words, little or no removal of a rock fraction), some lower S$_{BN}$ values were observed, but all of the S$_{BN}$ values were still at least 80.

Figure 3:
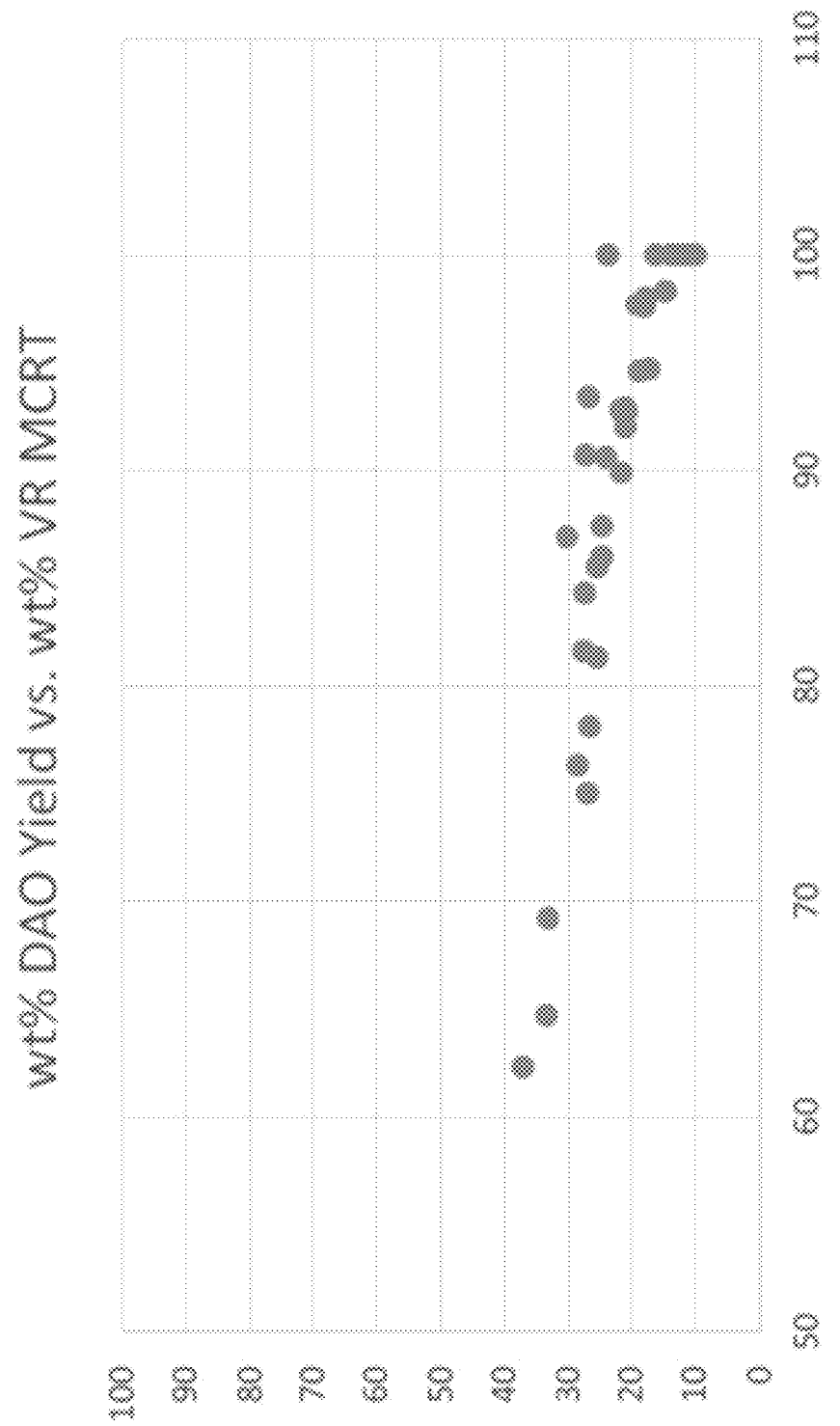
FIG. 3 shows deasphalted oil yield relative to micro carbon residue content in a vacuum resid feed for deasphalted oils generated by heptane deasphalting of various vacuum resid feeds.

FIG. 3 shows the deasphalted oil yields for the deasphalted oils in FIG. 2, but this time plotted against the micro carbon residue content of the vacuum resids used to form the deasphalted oils. As shown in FIG. 3, the yield of deasphalted oil from a vacuum resid has a mild correlation with the amount of micro carbon residue in the vacuum resid. It is noted that the vacuum resids that produced deasphalted oil yields of 60 wt % to 90 wt % all had micro carbon residue contents of at least 20 wt %. Two of the data points in FIG. 3 correspond to a) a vacuum resid with a micro carbon residue content of 26.9 wt % resulted in a 75 wt % yield of deasphalted oil; and b) a vacuum resid with a micro carbon residue content of 24.6 wt % resulted in a 87 wt % yield of deasphalted oil.

In addition to the vacuum resids shown in FIGS. 2 and 3, another vacuum resid was solvent deasphalted under two separate conditions. In a first deasphalting condition, deasphalting of the vacuum resid resulted in a 70 wt % yield of deasphalted oil with a S$_{BN}$ of 80. In a second deasphalting condition, deasphalting of the vacuum resid resulted in a 30 wt % yield of deasphalted oil with a S$_{BN}$ of 7. The second deasphalting condition corresponds to a conventional, low yield deasphalting condition using propane or butane as a deasphalting solvent. Such low yield deasphalting can tend to produce a deasphalted oil with a high paraffin content, which can lead to a corresponding low value of S$_{BN}$. Such a conventionally produced deasphalted oil can present difficulties if it is co-processed with other feeds having high values of S$_{BN}$ and I$_N$.

Example 2—Properties of Catalytic Slurry Oils, Deasphalted Oils, and Rock

Catalytic slurry oils were obtained from fluid catalytic cracking (FCC) processes operating on various feeds. Table 1 shows results from characterization of the catalytic slurry oils. Additionally, a blend of catalytic slurry oils from several FCC process sources was also formed and characterized.

TABLE 1

Characterization of Catalytic Slurry Oils

|  | CSO 1 | CSO 2 | CSO 3 | CSO 4 | CSO X (Blend) |
|---|---|---|---|---|---|
| API Gravity (15° C.) | −7.5 | −9.0 | 1.2 | −5.0 | −3.0 |
| S (wt %) | 4.31 | 4.27 | 1.11 | 1.82 | 3.07 |
| N (wppm) | 1940 | 2010 | 1390 | 1560 | 1750 |
| H (wt %) | 6.6 | 6.5 | 8.4 | 7.0 | 7.3 |
| MCR (wt %) | 11.5 | 14.6 | 4.7 | 13.4 | 12.5 |
| n-heptane insolubles (wt %) | 4.0 | 8.7 | 0.4 | 5.0 | 0.7 |
| GCD (ASTM D2887) (wt %) | | | | | |
| <316° C. | 2 | | 4 | | 3 |
| 316° C.-371° C. | 11 | | 13 | | 12 |
| 371° C.-427° C. | 43 | | 40 | | 36 |
| 427° C.-482° C. | 27 | | 26 | | 28 |
| 482° C.-538° C. | 7 | | 10 | | 10 |
| 538° C.-566° C. | 2 | | 2 | | 2 |
| 566° C.+ | 8 | | 5 | | 9 |

As shown in Table 1, typical catalytic slurry oils (or blends of such slurry oils) can represent a low value and/or challenged feed. The catalytic slurry oils have an API Gravity at 15° C. of less than 1.5, and often less than 0. The catalytic slurry oils can have sulfur contents of greater than 1.0 wt %, nitrogen contents of at least 1000 wppm, and hydrogen contents of less than 8.5 wt %, or less than 7.5 wt %, or less than 7.0 wt %. The catalytic slurry oils can also be relatively high in micro carbon residue (MCR), with values of at least 4.5 wt %, or at least 6.5 wt %, and in some cases greater than 10 wt %. The catalytic slurry oils can also contain a substantial n-heptane insolubles (asphaltene) content, for example at least 0.3 wt %, or at least 1.0 wt %, or at least 4.0 wt %. It is noted that the boiling range of the catalytic slurry oils has more in common with a vacuum gas oil than a vacuum resid, as less than 10 wt % of the catalytic slurry oils corresponds to 566° C.+ compounds, and less than 15 wt % corresponds to 538° C.+ compounds.

Although boiling ranges are not shown for CSO 2 in Table 1, it is noted that CSO 2 had a T10 distillation point of 687° F. (~364° C.), a T50 distillation point of 781° F. (~416° C.), and a T90 distillation point of 1021° F. (~549° C.). CSO 2 had a S$_{BN}$ of 235.

Table 2 provides characterization of deasphalted oils made from the catalytic slurry oils corresponding to CSO 2 and CSO 4. The deasphalted oils in Table 2 were formed by solvent deasphalting with n-pentane at a 6:1 (by volume) solvent to oil ratio. The deasphalting was performed at 600 psig (~4.1 MPag) within a top tower temperature window of 150° C. to 200° C. Under the deasphalting conditions, the yield of deasphalted oil was at least 90 wt %.

TABLE 2

Characterization of Deasphalted Oils derived from Catalytic Slurry Oils

|  | DAO 2 | DAO 4 |
|---|---|---|
| API Gravity (15° C.) | −6.0 | −3.0 |
| S (wt %) | 4.31 | 1.81 |
| N (wppm) | 2060 | 1530 |

TABLE 2-continued

Characterization of Deasphalted Oils
derived from Catalytic Slurry Oils

|  | DAO 2 | DAO 4 |
|---|---|---|
| H (wt %) | 6.8 | 7.3 |
| MCR (wt %) | 7.0 | 6.6 |
| n-heptane insolubles (wt %) | 0.04 | 0.2 |
| GCD (ASTM D2887) (wt %) |  |  |
| <316° C. | 2 | 6 |
| 316° C.-371° C. | 13 | 23 |
| 371° C.-427° C. | 48 | 40 |
| 427° C.-482° C. | 25 | 19 |
| 482° C.-538° C. | 7 | 6 |
| 538° C.-566° C. | 1 | 1 |
| 566° C.+ | 4 | 5 |

As shown in Table 2, some of the properties of the deasphalted oil generated from catalytic slurry oil were similar to the original feed. For example, the API Gravity, sulfur, and nitrogen contents of DAO 2 and DAO 4 were similar to corresponding contents in CSO 2 and CSO 4, respectively. The yield of deaphalted oil for DAO 2 was 93 wt %. In addition to the values shown in Table 2, DAO 2 had a T10 distillation point of 681° F. (~361° C.), a T50 distillation point of 772° F. (~411° C.), and a T90 distillation point of 909° F. (~487° C.). DAO 2 had a $S_{BN}$ of 220.

The most notable difference between DAO 2 and DAO 4 in Table 2 relative to CSO 2 and CSO 4 in Table 1 is in the n-heptane insolubles content. Both DAO 2 and DAO 4 had a n-heptane insoluble content of 0.2 wt % or less, while the corresponding catalytic slurry oils had n-heptane insoluble contents that were at least an order of magnitude higher.

Deasphalting also appeared to have a beneficial impact on the amount of micro carbon residue (MCR). In particular, it was unexpectedly discovered that performing deasphalting on a catalytic slurry oil feed can result in a net reduction in the amount of MCR, and therefore a net reduction in the amount of coke that is eventually formed from an initial feedstock. To further illustrate the benefit of performing deasphalting on a catalytic slurry oil feed, Table 3 provides additional characterization details for DAO 2 and DAO 4, along with characterization of the corresponding rock made when forming DAO 2 and DAO 4. Some characterization of two additional deasphalted oils (DAO 5 and DAO 6) and the corresponding rock fractions is also included in Table 3.

MCR content. The final two columns provide the MCR content of the deasphalted oil and the MCR content of the catalytic slurry oil feed prior to deasphalting.

As shown in Table 3, deasphalting of CSO 2 and CSO 4 resulted in formation of deasphalted oils that had roughly half the MCR content of the feed. However, even though the corresponding rock fractions for DAO 2 and DAO 4 had MCR contents of greater than 50 wt %, due to the low yield of rock, the net amount of MCR content in the combined DAO and rock after deasphalting was reduced. For example, the initial MCR content of CSO 4 was roughly 13.4 wt %. DAO 2 had a MCR content of 6.6 wt %, while the corresponding rock fraction had a MCR content of roughly 65 wt %. Based on these values, for each 100 grams of initial feed corresponding to CSO 4, the combined amount of MCR in DAO 4 and the corresponding rock fraction was only about 9 grams, as opposed to the 13.4 grams that would be expected based on the MCR content of CSO 4. Similarly, for each 100 grams of CSO 2 that was deasphalted, the resulting deasphalted oil and rock had a combined MCR content of less than 12 grams, as opposed to the expected 14.6 grams. Thus, deasphalting led to a net reduction in MCR content in the deasphalting products of at least 10 wt % relative to the MCR content of the feed, or at least 15 wt %, or at least 20 wt %, such as up to 40 wt % or more of reduction in MCR content. This unexpected reduction in MCR content can facilitate reduced production of coke in the eventual products. Reducing coke production can allow for a corresponding increase in production of other beneficial products, such as fuel boiling range compounds.

Table 3 also provides the carbon and hydrogen contents of the rock fractions produced during deasphalting of the various catalytic slurry oil feeds. As shown in Table 3, all of the rock fractions had a hydrogen content of less than about 5.5 wt %. This is an unexpectedly low hydrogen content for a fraction generated from an initial feed in a liquid state. In addition to the values shown in Table 3, the rock formed from deasphalting of CSO 2 had a T10 distillation point of 859° F. (~459° C.), a T30 distillation point of 1074° F. (~579° C.), and a T66 distillation point of 1292° F. (~700° C.). Thus, the rock formed from deasphalting of CSO 2 had a substantial content (such as at least 20 wt %) of compounds boiling below 566° C.

TABLE 3

Micro Carbon Residue content in Catalytic Slurry Oil DAO and Rock

|  | S:O | DAO Yield (wt %) | Rock Composition (wt %) | | | DAO MCR | Combined MCR of DAO + Rock (per 100 g feed) | Feed MCR |
|---|---|---|---|---|---|---|---|---|
|  |  |  | C | H | MCR |  |  |  |
| CSO 2 | 6 | 93 | 90.1 | 5.2 | 64.8 | 7.0 | 11.46 | 14.6 |
| CSO 4 | 6 | 95 | 81.9 | 5.3 | 52.4 | 6.6 | 8.9 | 13.4 |
| CSO 5 | 4 | 92 | 91.5 | 5.2 | 64.3 |  |  |  |
| CSO 6 | 3 | 86 | 92.1 | 5.3 | 60.1 |  |  |  |

Figure 4:
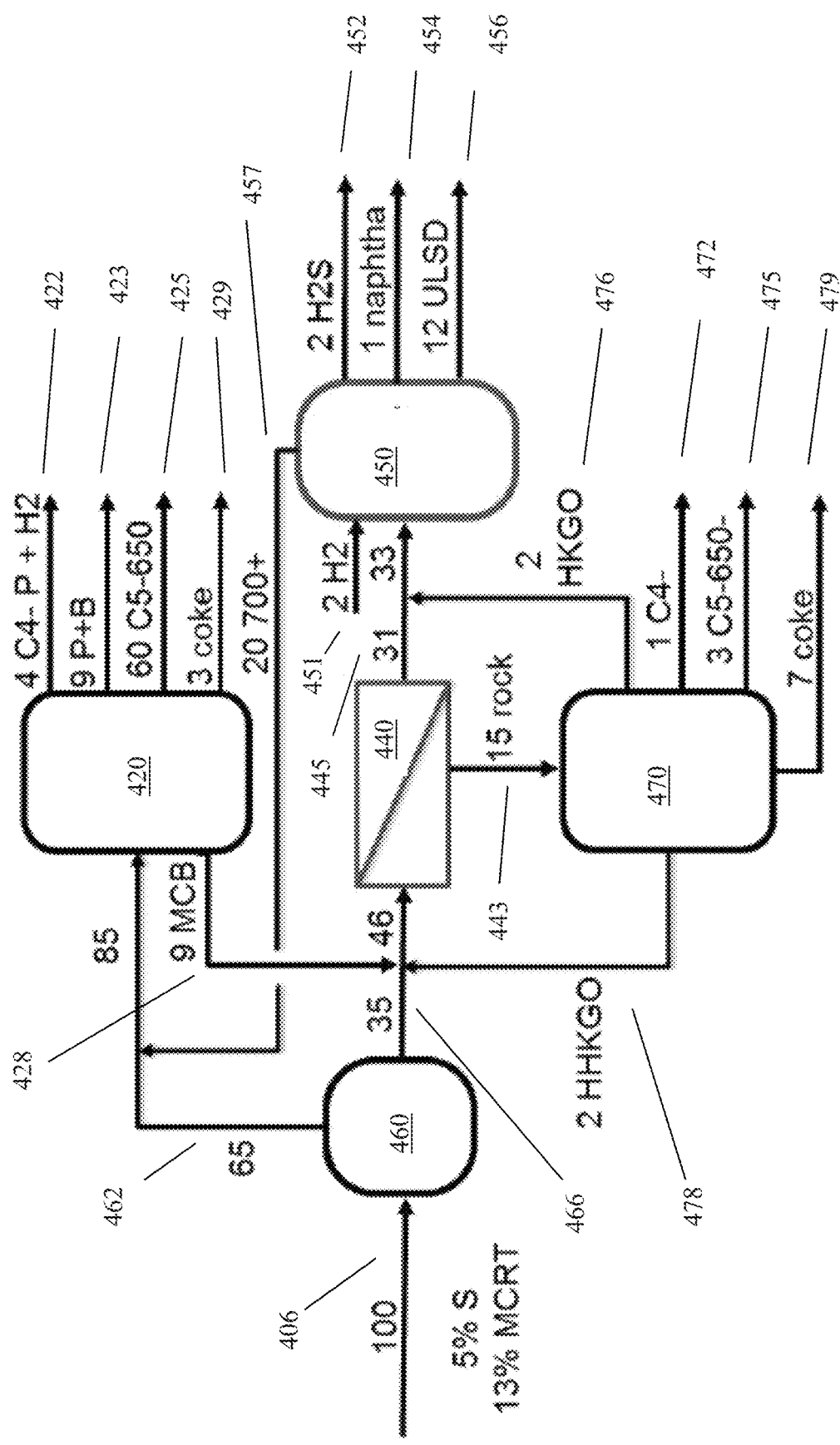
FIG. 4 shows an example of a reaction system for integrated processing of an atmospheric resid feed that includes predicted mass balance values.

In Table 3, "S:O" refers to the solvent to oil ratio (by volume) used to form the deasphalted oil and rock fractions. The solvent was n-pentane. The next column provides the average yield of deasphalted oil under the deasphalting conditions (pressure of ~4.1 MPag, temperature 150° C.-200° C.). The next three columns provide characterization of the rock formed during deasphalting, including the Example 3—Integrated Processing of Atmospheric Resid FIG. 4 shows an example of a process configuration similar to FIG. 1. Additionally, FIG. 4 shows predicted mass balances for processing an atmospheric resid feed in an integrated configuration that includes fluid catalytic cracking, coking, deasphalting, and hydrotreating. The predicted mass balances are based in part on a processing model that has been fit to a wide variety of commercial scale and pilot scale processing runs.

In FIG. 4, a feed 406 corresponding to an atmospheric resid with a sulfur content of about 5.0 wt % and a micro carbon residue content of about 13 wt % is introduced into a vacuum distillation tower 460. The initial feed 406 is defined as corresponding to "100" mass units. The remaining mass units in the figure show the various predicted mass balance amounts of the streams in the configuration. The vacuum distillation in vacuum distillation tower 406 is performed at a cut point of roughly 566° C. to produce a vacuum gas oil 462 and a vacuum resid 466.

The vacuum gas oil 462 is passed into fluid catalytic cracking unit 420. Optionally, at least a portion of a 371° C.+ fraction 457 from hydrotreatment reactor 450 can also be passed into fluid catalytic cracking unit 420. The fluid catalytic cracking unit 420 can generate light paraffins and $H_2$ 422, light olefins (propylene and butylene) 423, fuels boiling range (naphtha plus diesel) 425, and catalytic slurry oil 428, which corresponds to the liquid bottoms from the process. Additionally, coke 429 which forms on the FCC catalyst is also shown as a product for purposes of showing the full mass balance. The light paraffins, light olefins, and fuels boiling range fraction can be used and/or further processed in any convenient manner. The coke 429 can be removed from the FCC catalyst during catalyst regeneration. The catalytic slurry oil 428 can be used as part of the net feed that enters deasphalting unit 440.

Deasphalting unit 440 can receive a combined feed corresponding to vacuum resid 466, catalytic slurry oil 428, and coker bottoms 478. Deasphalting unit 440 can generate a deasphalted oil 445 and deasphalter rock 443. Deasphalted oil 445 can be passed into hydrotreating unit 450 while deasphalter rock 443 can be passed into coker 470. It is noted that the feed into the coker (deasphalter rock 443) corresponds to only 15 wt % of the original atmospheric resid feed. This is in contrast to a conventional configuration, where the entire vacuum resid 466 (corresponding to 35 wt % in this example) would be passed into the coker. This represents a substantial reduction in the amount of feed introduced into the coker. Additionally, based on the high lift from the deasphalting process, the total amount of micro carbon residue passed into the coker is also reduced, which can lead to a corresponding reduction in the amount of coke generated by the coker.

The deasphalter rock 443 is passed into the coker 470. The coker can generate a variety of fractions, including light ends 472, fuels fraction (naphtha and diesel) 475, and coke fraction 479. These fractions can be used and/or further processed in any convenient manner. Additionally, coker 470 can generate a heavy coker gas oil 476 and a coker bottoms 478. Heavy coker gas oil 476 can be added to deasphalted oil 445 as part of the feed to hydrotreating unit 450. Coker bottoms 478 can be used as part of the feed to deasphalting unit 440. This is in contrast to conventional operation, where coker bottoms 478 would be recycled as part of the feed to the coker 470. It is noted that the net coke production from coker 470 is only 7 wt % of the initial feed. This represents a relatively low coke yield, and is enabled in part based on the ability to incorporate a portion of the micro carbon residue from the feed into the deasphalted oil 445.

The deasphalted oil 445 and heavy coker gas oil 476 can be passed into hydrotreating unit 450 (or another type of hydroprocessing unit) along with hydrogen 451. The hydrotreatment unit 450 can generate a variety of fractions, including an $H_2S$ and light ends fraction 452, naphtha fraction 454, and diesel fraction 456. It is noted that the naphtha fraction 454 corresponds to less than 5 wt % of the net feed introduced into the hydrotreating unit 450. Additionally, hydrotreating unit 450 can generate a 371° C.+ gas oil fraction 458. The 371° C.+ gas oil fraction 478 can be passed into fluid catalytic cracking unit 420 as part of the feed. Alternatively, the 371° C.+ gas oil fraction 478 can be passed into a lubricant base oil processing train, used as a fuel oil, or further processed in any convenient manner.

For the predicted processing example shown in FIG. 4, 2 mass units of coker bottoms are combined with 9 mass units of catalytic slurry oil and 35 units of vacuum resid as a feed for deasphalting. In the predicted example corresponding to FIG. 4, the deasphalter corresponds to a pentane deasphalter that produces a 70 wt % yield of deasphalted oil with a $S_{BN}$ of 80. This is similar to one of the deasaphalting examples noted in Example 1. Under these conditions, the coker bottoms has a deasphalted oil yield of greater than 95 wt % with a $S_{BN}$ of close to 90. Under these conditions, the catalytic slurry oil has a deasphalted oil yield of 90 wt % to 95 wt % with a $S_{BN}$ of close to 200. The resulting net deasphalted oil (DAO) from the deasphalting unit is therefore a blend of about 2 weight parts of coker bottoms DAO with an $S_{BN}$ of 90, 24.5 weight parts of vacuum resid DAO with an $S_{BN}$ of 80, and 8.5 weight parts of a catalytic slurry oil DAO with a $S_{BN}$ of about 200. This corresponds to a net DAO to the hydrotreater with a $S_{BN}$ of about 110.

Example 4—Examples of Conventional Processing Configuration

In a conventional configuration for integrating deasphalting with hydrotreating, a typical feed to the hydrotreating unit can correspond to about 30 wt % propane and/or butane deasphalted oil, about 40 wt % of virgin vacuum gas oil, and about 30 wt % of heavy coker gas oil. The propane and/or butane deasphalted oil can have a range of $S_{BN}$ values between 5 and 65. The virgin vacuum gas oil can typically have a $S_{BN}$ of about 20 to about 40. The heavy coker gas oil can typically have a $S_{BN}$ of about 70 to about 90. Thus, the net feed to the hydrotreating unit in a conventional integration of deasphalting and hydrotreating can typically have a $S_{BN}$ of 60 or less, and often 50 or less. This is in contrast to the feed to the hydrotreating unit in Example 3, where the $S_{BN}$ of the feed to the hydrotreating unit is 80 or more, or 90 or more, or 100 or more, or 110 or more, such as up to 140 or possibly still higher.

Figure 5:
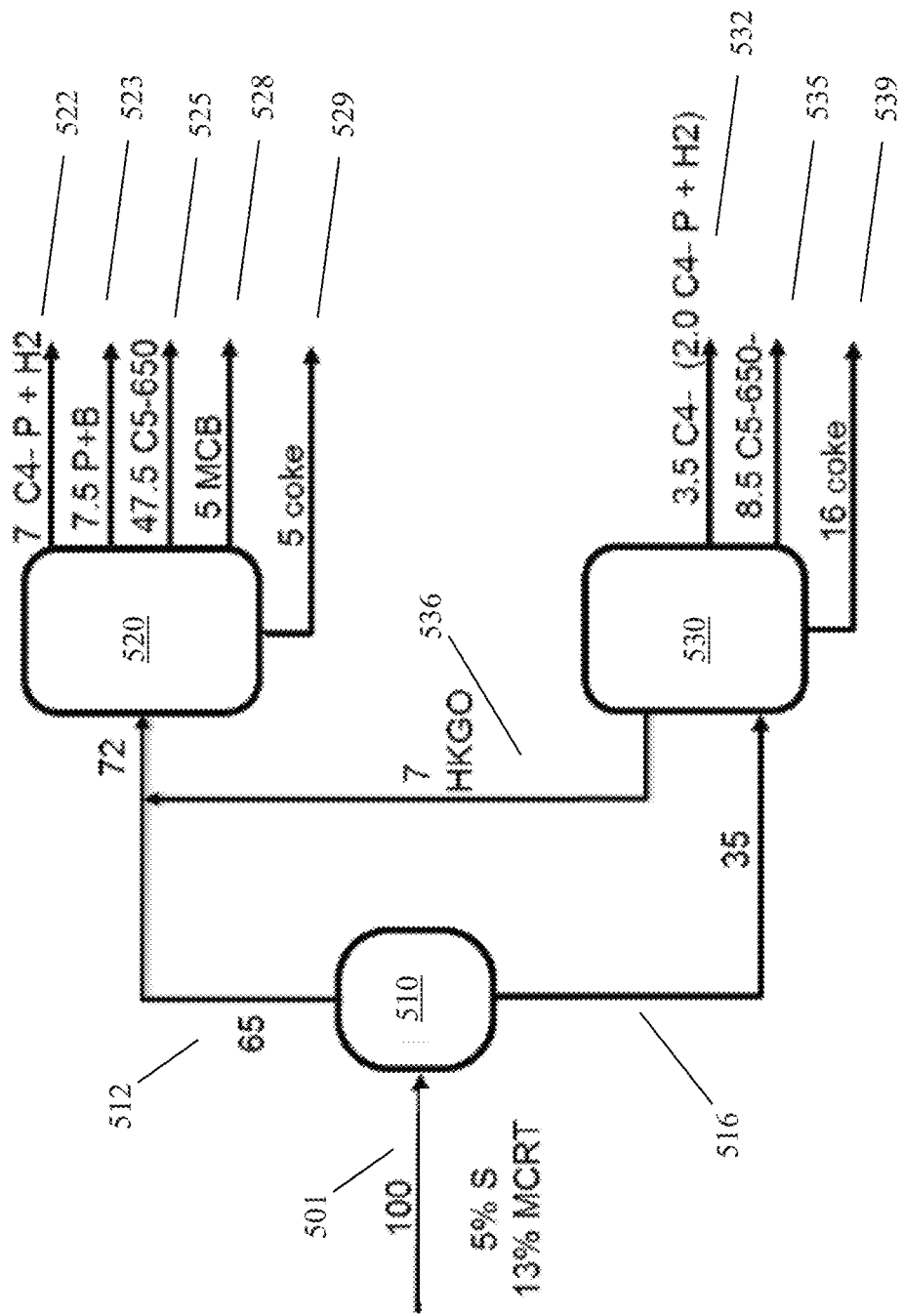
FIG. 5 shows an example of a reaction system for processing of an atmospheric resid feed that includes predicted mass balance values.

FIG. 5 shows a modeled example of a conventional configuration for processing an atmospheric resid feed. In FIG. 5, a coker 530 and a fluid catalytic cracking unit 520 are used to process the atmospheric resid feed. For comparison, predicted mass balance values based on conventional operation are also included in FIG. 5, based on an initial feed amount of 100 mass units. It is noted that the predicted mass balance values are based on the same feed used for the mass balances shown in FIG. 4.

In FIG. 5, the feed 501 is separated using vacuum distillation unit 510 into a vacuum gas oil 512 and a vacuum resid 516. The relative weights of the vacuum gas oil 512 and vacuum resid 516 are the same as the relative weights of vacuum gas oil 462 and vacuum resid 466 in FIG. 4.

Similar to FIG. 4, vacuum gas oil 512 is passed into fluid catalytic cracking unit 520. Additionally, a heavy coker gas oil 336 from coker 330 is also passed into fluid catalytic cracking unit 420. The fluid catalytic cracking unit 420 can generate light paraffins and $H_2$ 422, light olefins (propylene and butylene) 423, fuels boiling range (naphtha plus diesel) 425, and catalytic slurry oil 428, which corresponds to the liquid bottoms from the process. Additionally, coke 429 which forms on the FCC catalyst is also shown as a product for purposes of showing the full mass balance. The light paraffins, light olefins, and fuels boiling range fraction can be used and/or further processed in any convenient manner. The coke 429 can be removed from the FCC catalyst during catalyst regeneration. In a conventional configuration, the catalytic slurry oil 428 is typically used as a low value feed, such as by incorporation of the catalytic slurry oil into a regular sulfur fuel oil.

The vacuum resid 516 in FIG. 5 is used directly as the feed to coker 530. In addition to the vacuum resid 516 having a larger volume than the corresponding feed for the coker in FIG. 4, the vacuum resid also has a larger micro carbon residue content, as nearly all of the micro carbon residue content from the original atmospheric resid 501 is still present in vacuum gas oil 516. As a result, the amount of processing load on coker 530 is substantially greater than the processing load on coker 470 in FIG. 4. Due in part to the additional micro carbon residue introduced into coker 530, the amount of coke 539 generated by coker 530 is predicted to correspond to 16 wt % of the initial feed 501. This is in contrast to the predicted mass balance in FIG. 4, where the coke yield 479 from coker 470 is only 7 wt % of the initial feed. It is noted that the reduced amount of coke yield 479 in the predicted mass balance in FIG. 4 is a net gain in liquid product. Even if the fluid catalytic cracker in FIG. 4 were operated identically to FIG. 5, the FCC coke products 429 and 529 would be comparable, while the light ends yields in FIG. 4 are lower than the light ends yields in FIG. 5. Thus, the configuration shown in FIG. 4 (and in FIG. 1) provides an opportunity to reduce the process load on a coking unit while also increasing the liquid product yield from an integrated process on the order of 5 wt % to 10 wt % relative to the input feed.

Additional Embodiments

Embodiment 1

A method for processing a feedstock including at least one cracked feed component, comprising: performing solvent deasphalting on a feedstock comprising a solubility blending number ($S_{BN}$) of 100 or more (or 110 or more, or 120 or more), a T90 distillation point of 566° C. or more, 8.0 wt % or more of micro carbon residue, and 10 wt % or more of cracked feed to form a deasphalted oil and a deasphalter residue, a yield of the deasphalted oil being about 50 wt % or more (or about 70 wt % or more, or about 80 wt % or more) relative to a weight of the feedstock, the deasphalted oil comprising a $S_{BN}$ of about 80 or more (or about 90 or more, or about 100 or more) and about 2.0 wt % or more of micro carbon residue (or about 5.0 wt % or more); exposing at least a portion of the deasphalted oil to a hydroprocessing catalyst under effective hydroprocessing conditions to form a hydroprocessed effluent.

Embodiment 2

The method of Embodiment 1, further comprising coking at least a portion of the deasphalter residue under effective coking conditions to form a coker effluent and coke, the deasphalter residue optionally having a T10 distillation point of 566° C. or less.

Embodiment 3

The method of Embodiment 2, wherein the coker effluent comprises a coker bottoms, and wherein the feedstock comprises at least a portion of the coker bottoms; or wherein the coker effluent comprises a coker gas oil, and wherein the exposing at least a portion of the deasphalted oil to a hydroprocessing catalyst under effective hydroprocessing conditions further comprises exposing a portion of the coker gas oil having a T10 distillation point of at least 343° C. to the hydroprocessing catalyst under the effective hydroprocessing conditions; or a combination thereof.

Embodiment 4

The method of any of the above embodiments, wherein a $C_{5+}$ portion of the hydroprocessed effluent has an API gravity that is about 15 or more greater than an API gravity of the at least a portion of the deasphalted oil, or about 17 or more greater, or about 20 or more greater.

Embodiment 5

The method of any of the above embodiments, wherein the hydroprocessed effluent comprises a naphtha boiling range fraction, a yield of the naphtha boiling range fraction being about 10.0 wt % or less relative to a weight of the at least a portion of the deasphalted oil, or about 8.0 wt % or less, or about 6.0 wt % or less.

Embodiment 6

The method of any of the above embodiments, wherein the feedstock and/or the at least a portion of the deasphalted oil comprises about 1.0 wt % organic sulfur or more, the hydroprocessed effluent comprising about 0.5 wt % or less of organic sulfur, or about 1000 wppm or less, or about 500 wppm or less, or about 100 wppm or less.

Embodiment 7

The method of any of the above embodiments, wherein the feedstock comprises 15 wt % or more of micro carbon residue, or 20 wt % or more; or wherein 40 wt % or more of the carbons in the feedstock comprise aromatic carbons, or 50 wt % or more, or 60 wt % or more; or a combination thereof.

Embodiment 8

The method of any of the above embodiments, wherein the deasphalted oil comprises about 5.0 wt % or more of micro carbon residue, or about 8.0 wt % or more; or wherein 30 wt % or more of the carbons in the deasphalted oil comprise aromatic carbons, or 40 wt % or more, or 50 wt % or more; or a combination thereof.

Embodiment 9

The method of any of the above embodiments, wherein the feedstock comprises at least 20 wt % of the cracked feed (or at least 30 wt %, or at least 50 wt %); or wherein the cracked feed comprises a catalytic slurry oil, a coker bottoms, a steam cracker tar, a visbreaker gas oil, a coal tar, or a combination thereof or wherein the cracked feed comprises at least 50 wt % of a catalytic slurry oil relative to a weight of the cracked feed; or wherein the cracked feed comprises cracked feed having an T5 distillation point of at least 149° C. and a T90 distillation point of 566° C. or less; or a combination thereof.

Embodiment 10

The method of any of the above embodiments, further comprising: separating a first fraction having a T10 distillation point of at least 510° C. and a second fraction having a lower T10 distillation point from a feed having a T10 distillation point of at least 300° C., the feedstock comprising at least a portion of the first fraction; and exposing the second fraction to a catalyst under fluid catalytic cracking conditions to form a fluid catalytic cracking effluent comprising the catalytic slurry oil.

Embodiment 11

The method of Embodiment 10, wherein the hydroprocessed effluent comprises a hydroprocessed gas oil boiling range fraction, and wherein exposing the second fraction to a catalyst under fluid catalytic cracking conditions further comprises exposing at least a portion of the hydroprocessed gas oil boiling range fraction to the catalyst under the fluid catalytic cracking conditions.

Embodiment 12

A deasphalted oil comprising a $S_{BN}$ of about 80 or more, 2.0 wt % or more of micro carbon residue, and a T10 distillation point of 454° C. or less, wherein about 30 to wt % or more of the carbons in the deasphalted oil comprise aromatic carbons.

Embodiment 13

The deasphalted oil of Embodiment 12, wherein the deasphalted oil comprises about 5.0 wt % or more of micro carbon residue, or about 8.0 wt % or more; or wherein about 40 wt % or more of the carbons in the deasphalted oil comprise aromatic carbons, or about 50 wt % or more; or wherein the deasphalted oil has a T50 distillation point of 566° C. or less; or wherein the deasphalted oil has a API gravity of 0 or less, or –2.0 or less; or a combination thereof.

Embodiment 14

A system for processing a feedstock, comprising: a reduced pressure separation stage for forming a first fraction and a second fraction; a fluid catalytic cracker comprising a fluid catalytic cracking (FCC) inlet and an FCC outlet, the FCC inlet being in fluid communication with the reduced pressure separation stage for receiving the first fraction; a deasphalting unit comprising a deasphalting inlet a, deasphalted oil outlet, and a deasphalter residue outlet, the deasphalting inlet being in fluid communication with the reduced pressure separation stage for receiving the second fraction, the deasphalting inlet being further in fluid communication with the FCC outlet for receiving a catalytic slurry oil fraction; a coker comprising a coker inlet and a coker outlet, the coker inlet being in fluid communication with the deasphalter residue outlet, the deasphalting inlet being further in fluid communication with the coker outlet for receiving a coker bottoms fraction; and a hydroprocessing stage comprising a hydroprocessing inlet and a hydroprocessing outlet, the hydroprocessing inlet being in fluid communication with the deasphalted oil outlet, the FCC inlet being further in fluid communication with the hydroprocessing outlet for receiving a hydroprocessed gas oil boiling range fraction.

Embodiment 15

The system of Embodiment 14, wherein the hydroprocessing inlet is further in fluid communication with the coker outlet for receiving a coker gas oil fraction.

Additional Embodiment A

A deashpalted oil made according to any of Embodiments 1-11.

Additional Embodiment B

A hydroprocessed deasphalted oil made according to any of Embodiments 1-11.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for processing a feedstock including at least one cracked feed component, comprising:
performing solvent deasphalting on a feedstock comprising a solubility blending number ($S_{BN}$) of 100 or more, a T90 distillation point of 566° C. or more, 8.0 wt % or more of micro carbon residue, and 10 wt % or more of cracked feed to form a deasphalted oil and a deasphalter residue, a yield of the deasphalted oil being about 50 wt % or more relative to a weight of the feedstock, the deasphalted oil comprising a $S_{BN}$ of about 80 or more and about 2.0 wt % or more of micro carbon residue;
exposing at least a portion of the deasphalted oil to a hydroprocessing catalyst under effective hydroprocessing conditions to form a hydroprocessed effluent; and
coking at least a portion of the deasphalter residue under effective coking conditions to form a coker effluent, wherein the coker effluent comprises a coker bottoms, the feedstock comprising at least a portion of the coker bottoms, and coke.

2. The method of claim 1, wherein a $C_{5+}$ portion of the hydroprocessed effluent has an API gravity that is about 15 or more greater than an API gravity of the at least a portion of the deasphalted oil.

3. The method of claim 1, wherein the hydroprocessed effluent comprises a naphtha boiling range fraction, a yield of the naphtha boiling range fraction being about 10.0 wt % or less relative to a weight of the at least a portion of the deasphalted oil.

4. The method of claim 1, wherein the feedstock comprises about 1.0 wt % organic sulfur or more, the hydroprocessed effluent comprising about 0.5 wt % or less of organic sulfur.

5. The method of claim 1, wherein the feedstock comprises 15 wt % or more of micro carbon residue; or wherein 40 wt % or more of the carbons in the feedstock comprise aromatic carbons; or a combination thereof.

6. The method of claim 1, wherein the deasphalted oil comprises about 5.0 wt % or more of micro carbon residue; or wherein 30 wt % or more of the carbons in the deasphalted oil comprise aromatic carbons; or a combination thereof.

7. The method of claim 1, wherein the deasphalter residue has a T10 distillation point of 566° C. or less.

8. The method of claim 1, wherein the cracked feed comprises a catalytic slurry oil, a coker bottoms, a steam cracker tar, a visbreaker gas oil, a coal tar, or a combination thereof.

9. The method of claim 1, wherein the feedstock comprises at least 20 wt % of the cracked feed; or wherein the cracked feed comprises at least 50 wt % of a catalytic slurry oil relative to a weight of the cracked feed; or a combination thereof.

10. The method of claim 1, wherein the cracked feed comprises cracked feed having an T5 distillation point of at least 149° C. and a T90 distillation point of 566° C. or less.

11. A method for processing a feedstock including at least one cracked feed component, comprising:
performing solvent deasphalting on a feedstock comprising a solubility blending number ($S_{BN}$) of 100 or more, a T90 distillation point of 566° C. or more, 8.0 wt % or more of micro carbon residue, and 10 wt % or more of cracked feed to form a deasphalted oil and a deasphalter residue, a yield of the deasphalted oil being about 50 wt % or more relative to a weight of the feedstock, the deasphalted oil comprising a $S_{BN}$ of about 80 or more and about 2.0 wt % or more of micro carbon residue;
exposing at least a portion of the deasphalted oil to a hydroprocessing catalyst under effective hydroprocessing conditions to form a hydroprocessed effluent; and
coking at least a portion of the deasphalter residue under effective coking conditions to form a coker effluent, wherein the coker effluent comprises a coker gas oil, and wherein the exposing at least a portion of the deasphalted oil to a hydroprocessing catalyst under effective hydroprocessing conditions further comprises exposing a portion of the coker gas oil having a T10 distillation point of at least 343° C. to the hydroprocessing catalyst under the effective hydroprocessing conditions, and coke.

12. The method of claim 11, wherein a $C_{5+}$ portion of the hydroprocessed effluent has an API gravity that is about 15 or more greater than an API gravity of the at least a portion of the deasphalted oil.

13. The method of claim 11, wherein the hydroprocessed effluent comprises a naphtha boiling range fraction, a yield of the naphtha boiling range fraction being about 10.0 wt % or less relative to a weight of the at least a portion of the deasphalted oil.

14. The method of claim 11, wherein the feedstock comprises about 1.0 wt % organic sulfur or more, the hydroprocessed effluent comprising about 0.5 wt % or less of organic sulfur.

15. The method of claim 11, wherein the feedstock comprises 15 wt % or more of micro carbon residue; or wherein 40 wt % or more of the carbons in the feedstock comprise aromatic carbons; or a combination thereof.

16. A method for processing a feedstock including at least one cracked feed component, comprising:
performing solvent deasphalting on a feedstock comprising a solubility blending number ($S_{BN}$) of 100 or more, a T90 distillation point of 566° C. or more, 8.0 wt % or more of micro carbon residue, and 10 wt % or more of cracked feed to form a deasphalted oil and a deasphalter residue, a yield of the deasphalted oil being about 50 wt % or more relative to a weight of the feedstock, the deasphalted oil comprising a $S_{BN}$ of about 80 or more and about 2.0 wt % or more of micro carbon residue;
exposing at least a portion of the deasphalted oil to a hydroprocessing catalyst under effective hydroprocessing conditions to form a hydroprocessed effluent;
separating a first fraction having a T10 distillation point of at least 510° C. and a second fraction having a lower T10 distillation point from a feed having a T10 distillation point of at least 300° C., the feedstock comprising at least a portion of the first fraction; and
exposing the second fraction to a catalyst under fluid catalytic cracking conditions to form a fluid catalytic cracking effluent comprising a catalytic slurry oil.

17. The method of claim 16, wherein the hydroprocessed effluent comprises a hydroprocessed gas oil boiling range fraction, and wherein exposing the second fraction to a catalyst under fluid catalytic cracking conditions further comprises exposing at least a portion of the hydroprocessed gas oil boiling range fraction to the catalyst under the fluid catalytic cracking conditions.

18. The method of claim 16, wherein a $C_{5+}$ portion of the hydroprocessed effluent has an API gravity that is about 15 or more greater than an API gravity of the at least a portion of the deasphalted oil.

19. The method of claim 16, wherein the hydroprocessed effluent comprises a naphtha boiling range fraction, a yield of the naphtha boiling range fraction being about 10.0 wt % or less relative to a weight of the at least a portion of the deasphalted oil.

20. The method of claim 16, wherein the feedstock comprises about 1.0 wt % organic sulfur or more, the hydroprocessed effluent comprising about 0.5 wt % or less of organic sulfur.

* * * * *